(12) United States Patent
Sugano

(10) Patent No.: US 11,548,499 B2
(45) Date of Patent: Jan. 10, 2023

(54) AUTOMATIC PARKING SYSTEM

(71) Applicant: Toyota Jidosha Kabushiki Kaisha, Toyota (JP)

(72) Inventor: Tatsuya Sugano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 16/917,314

(22) Filed: Jun. 30, 2020

(65) Prior Publication Data

US 2021/0086757 A1 Mar. 25, 2021

(30) Foreign Application Priority Data

Sep. 25, 2019 (JP) .............................. JP2019-174456

(51) Int. Cl.
| | |
|---|---|
| *B60W 30/06* | (2006.01) |
| *B60W 60/00* | (2020.01) |
| *G08G 1/14* | (2006.01) |
| *G08G 1/00* | (2006.01) |
| *B60W 50/14* | (2020.01) |

(52) U.S. Cl.
CPC ............ *B60W 30/06* (2013.01); *B60W 50/14* (2013.01); *B60W 60/0025* (2020.02); *G08G 1/142* (2013.01); *G08G 1/20* (2013.01); *G08G 1/22* (2013.01)

(58) Field of Classification Search
CPC ............... B60W 30/06; B62D 15/0285; B62D 15/0265; G08G 1/148; B60T 2201/022; B60T 8/17558; B60G 2800/242

See application file for complete search history.

(56) References Cited

U.S. PATENT DOCUMENTS

| | | | | |
|---|---|---|---|---|
| 2019/0382002 A1* | 12/2019 | Yamazaki | ............. | B60W 30/06 |
| 2020/0290601 A1* | 9/2020 | Yamanaka | ............. | B60W 10/20 |

FOREIGN PATENT DOCUMENTS

| | | |
|---|---|---|
| JP | 2015072651 A | 4/2015 |
| JP | 2018147477 A | 9/2018 |
| JP | 2019-121040 A | 7/2019 |

* cited by examiner

*Primary Examiner* — Genna M Mott
*Assistant Examiner* — Andy Schneider
(74) *Attorney, Agent, or Firm* — Dinsmore & Shohl LLP

(57) ABSTRACT

An automatic parking system instructs a plurality of autonomous driving vehicles in a parking lot such that each autonomous driving vehicle parks in a target parking space within the parking lot, and includes an instruction change target vehicle specifying unit configured to, in a case where the autonomous driving vehicle becomes a failed vehicle due to abnormality or communication interruption during automatic driving according to instruction, specify an instruction change target vehicle from normal autonomous driving vehicles based on parking lot map information, a location of the failed vehicle, and a location of the normal autonomous driving vehicles, and a vehicle instruction unit configured to, in a case where the instruction change target vehicle is specified, issue a route change instruction, an evacuation instruction, or a stop instruction to the instruction change target vehicle, such that the instruction change target vehicle gets away from the failed vehicle.

4 Claims, 9 Drawing Sheets

AUTOMATIC PARKING SYSTEM

CROSS-REFERENCE TO RELATED APPLICATION

This application claims priority to Japanese Patent Application No. 2019-174456 filed on Sep. 25, 2019 incorporated herein by reference in its entirety.

BACKGROUND

1. Technical Field

The present disclosure relates to an automatic parking system.

2. Description of Related Art

Japanese Unexamined Patent Application Publication No. 2019-121040 (JP 2019-121040 A) is well-known as a technology related to an automatic parking system. JP 2019-121040 A discloses a parking control device that outputs a travel instruction to cause autonomous driving vehicles to travel to a target location through a target route of a parking lot, in which, when it is determined that there is an obstacle such as a fallen object on the target route, some of the vehicles are selected as selected vehicles, and a second instruction including an operation instruction which is different from the travel instruction is output to the selected vehicles.

SUMMARY

However, in an automatic valet parking system in which an autonomous driving vehicle is automatically driven and parked according to an instruction from the parking lot side, failure such as an abnormality or communication interruption may occur in the autonomous driving vehicle. In such a case, it is desirable to specify the autonomous driving vehicle for which the instruction should be changed in response to the failed vehicle, and change the instruction in consideration of the failed vehicle.

One aspect of the present disclosure is an automatic parking system that instructs a plurality of autonomous driving vehicles in a parking lot such that each of the autonomous driving vehicles parks in a target parking space within the parking lot. The automatic parking system includes an instruction change target vehicle specifying unit configured to, in a case where the autonomous driving vehicle becomes a failed vehicle due to abnormality or communication interruption during automatic driving according to an instruction, specify an instruction change target vehicle from normal autonomous driving vehicles which are autonomous driving vehicles other than the failed vehicle, based on parking lot map information, a location of the failed vehicle, and a location of the normal autonomous driving vehicles, and a vehicle instruction unit configured to, in a case where the instruction change target vehicle specifying unit specifies the instruction change target vehicle, issue a route change instruction, an evacuation instruction, or a stop instruction to the instruction change target vehicle, such that the instruction change target vehicle gets away from the failed vehicle.

With the automatic parking system according to one aspect of the present disclosure, in a case where the autonomous driving vehicle becomes a failed vehicle due to abnormality or communication interruption during the automatic driving according to the instruction, an instruction change target vehicle is specified from normal autonomous driving vehicles based on parking lot map information, a location of the failed vehicle, and the normal autonomous driving vehicles which are autonomous driving vehicles other than the failed vehicle, and then a route change instruction, an evacuation instruction, or a stop instruction is issued to the instruction change target vehicle, such that the instruction change target vehicle gets away from the failed vehicle. With the automatic parking system, the instruction change target vehicle is specified and the instruction is changed as the failed vehicle exists, thus it is possible to reduce the influence of the failed vehicle on the instruction change target vehicle during automatic valet parking due to the failed vehicle, as compared with a case where the instruction is not changed for other autonomous driving vehicles when the failed vehicle exists.

In the automatic parking system according to one aspect of the present disclosure, the instruction change target vehicle specifying unit may specify, as the instruction change target vehicle, a normal autonomous driving vehicle located in a target area which is an area from the failed vehicle to an intersection located one section behind the failed vehicle. With the automatic parking system, in a case where a failed vehicle exists, a normal autonomous driving vehicle located in the target area from the failed vehicle to the intersection located one section behind the failed vehicle is specified as the instruction change target vehicle, thus it is possible to reduce the influence of the failed vehicle which may cause the instruction change target vehicle to be unable to move forward due to the failed vehicle obstructing the traveling path.

In the automatic parking system according to one aspect of the present disclosure, the instruction change target vehicle specifying unit may specify, as the instruction change target vehicle, the normal autonomous driving vehicle expected to enter the target area. With the automatic parking system, in a case where a failed vehicle exists, the normal autonomous driving vehicle expected to enter the target area from the failed vehicle to the intersection located on section behind the failed vehicle is specified as the instruction change target vehicle, thus it is possible to prevent the instruction change target vehicle from entering the target area and being unable to move forward due to the failed vehicle.

In the automatic parking system according to one aspect of the present disclosure, the parking lot may be a multi-story parking lot having a plurality of levels, and the instruction change target vehicle specifying unit may be configured to specify, as the instruction change target vehicle, the normal autonomous driving vehicle located at the same level as the failed vehicle. With the automatic parking system, in a case where a failed vehicle exists during the automatic valet parking in the multi-story parking lot, a normal autonomous driving vehicle located at the level where the failed vehicle is located is specified as the instruction change target vehicle, thus it is possible to reduce the influence of the failed vehicle on the instruction change target vehicle during the automatic valet parking at the level where the failed vehicle is located.

In the automatic parking system according to one aspect of the present disclosure, the instruction change target vehicle specifying unit may specify, as the instruction change target vehicle, the normal autonomous driving vehicle expected to enter the same level as the failed vehicle. With the automatic parking system, in a case where a failed vehicle exists during the automatic valet parking in the multi-story parking lot, the normal autonomous driving vehicle expected to enter the level where the failed vehicle is located is specified as the instruction change target vehicle, thus it is possible to reduce the influence of the failed vehicle on the instruction change target vehicle expected to enter the level where the failed vehicle is located.

In the automatic parking system of one aspect of the present disclosure, the instruction change target vehicle specifying unit may be configured to, in a case where the autonomous driving vehicle becomes the failed vehicle due to the communication interruption, specify, as the instruction change target vehicle, the normal autonomous driving vehicle located on a target route which is an area from the location of the failed vehicle to the target parking space in which the failed vehicle is instructed to park. With the automatic parking system, in a case where a failed vehicle exists, the normal autonomous driving vehicle located on the target route from the location of the failed vehicle to the target parking space in which the failed vehicle is instructed to park is specified as the instruction change target vehicle, thus it is possible to reduce the influence of the failed vehicle on the instruction change target vehicle when the failed vehicle starts autonomously traveling toward the target parking space.

In the automatic parking system of one aspect of the present disclosure, the instruction change target vehicle specifying unit may be configured to, in a case where the autonomous driving vehicle becomes the failed vehicle due to the communication interruption, specify, as the instruction change target vehicle, the normal autonomous driving vehicle expected to enter the target route from the location of the failed vehicle to the target parking space in which the failed vehicle is instructed to park. With the automatic parking system, in a case where a failed vehicle exists, the normal autonomous driving vehicle expected to enter the target route from the location of the failed vehicle to the target parking space in which the failed vehicle is instructed to park is specified as the instruction change target vehicle, thus it is possible to reduce the influence of the failed vehicle on the instruction change target vehicle when the failed vehicle starts autonomously traveling toward the target parking space.

In the automatic parking system of one aspect of the present disclosure, the automatic parking system may further include a user notification unit configured to, in a case where the instruction change target vehicle to which the evacuation instruction or the stop instruction has been transmitted is leaving the parking lot, transmit a notification that the autonomous driving vehicle has stopped leaving the parking lot to a user terminal of a user of the instruction change target vehicle. With the automatic parking system, in a case where the instruction change target vehicle to which the evacuation instruction or the stop instruction has been transmitted is leaving the parking lot, the notification that the autonomous driving vehicle has stopped leaving the parking lot is transmitted to the user terminal of the user of the instruction change target vehicle, and thus it is possible to notify the user waiting for arrival of the instruction change target vehicle about the situation.

With one aspect of the present disclosure, the instruction change target vehicle is specified and the instruction is changed as a failed vehicle exists, thus it is possible to reduce the influence of the failed vehicle on the instruction change target vehicle during the automatic valet parking due to the failed vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to drawings.

Figure 1:
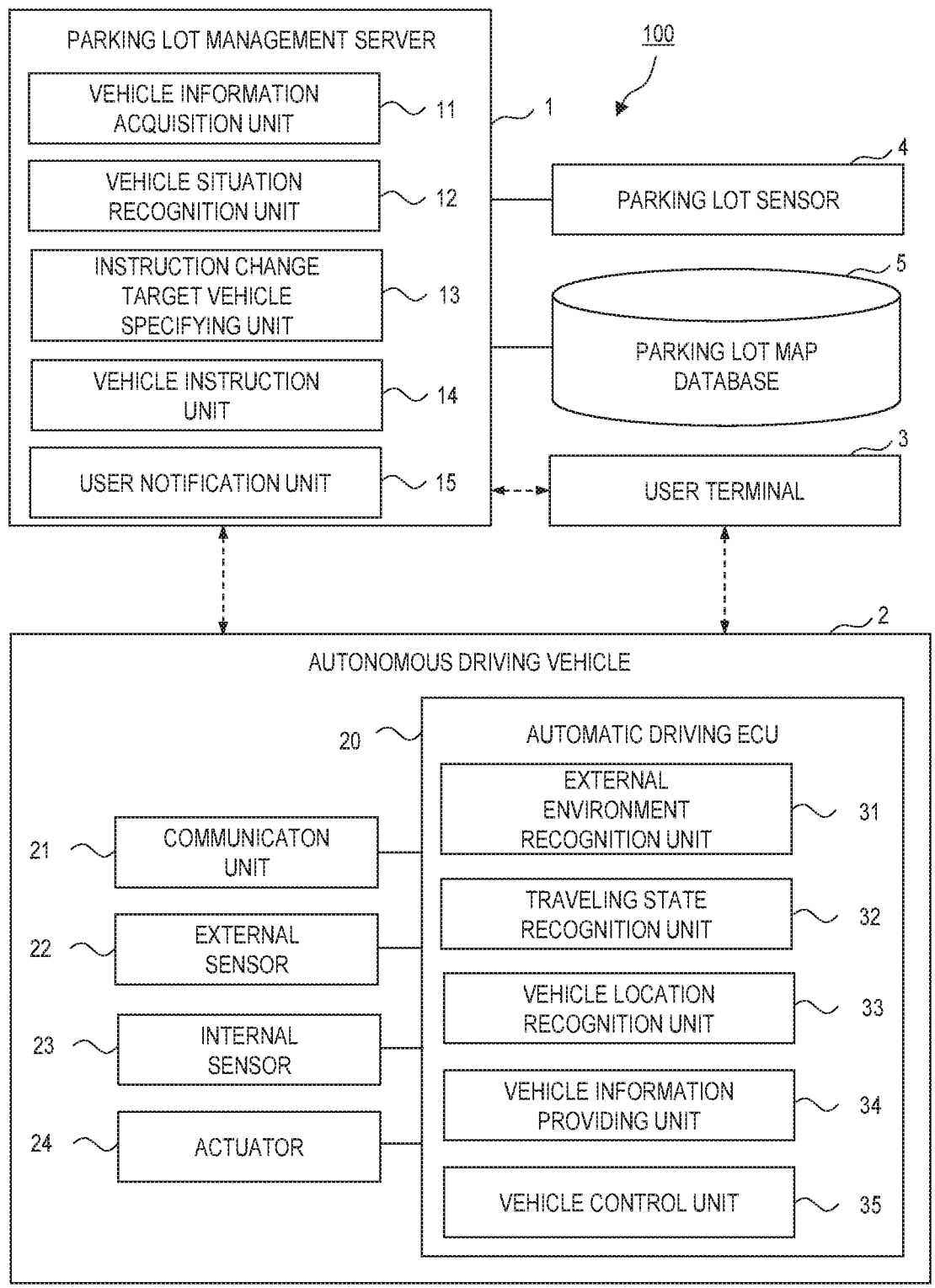
FIG. 1 is a block diagram illustrating a configuration of an automatic parking system according to one embodiment.

FIG. 1 is a block diagram illustrating a configuration of an automatic parking system 100 according to one embodiment. The automatic parking system (or automated valet parking system; AVPS) 100 shown in FIG. 1 is a system for performing automatic valet parking of autonomous driving vehicles 2 in a parking lot.

The automatic valet parking is a service wherein the unmanned autonomous driving vehicle 2 from which a user (occupant) alights at a drop-off area within a parking lot is directed to travel on a target route so as to be automatically parked in a target parking space within the parking lot. The target parking space is a parking space preset as a parking location of the autonomous driving vehicle 2. The target route is a route within the parking lot, on which the autonomous driving vehicle 2 travels to reach the target parking space. The target route when the vehicle leaves the parking lot is a route that the vehicle travels to reach a pick-up space (described later).

The parking lot may be a parking lot dedicated to the automatic valet parking, or may also serve as a parking lot for general vehicles not subject to the automatic valet parking. A portion of the parking lot for general vehicles may be used as an area exclusively for the automatic valet parking. In the present embodiment, a parking lot dedicated to the automatic valet parking will be explained as an example.

Figure 2:
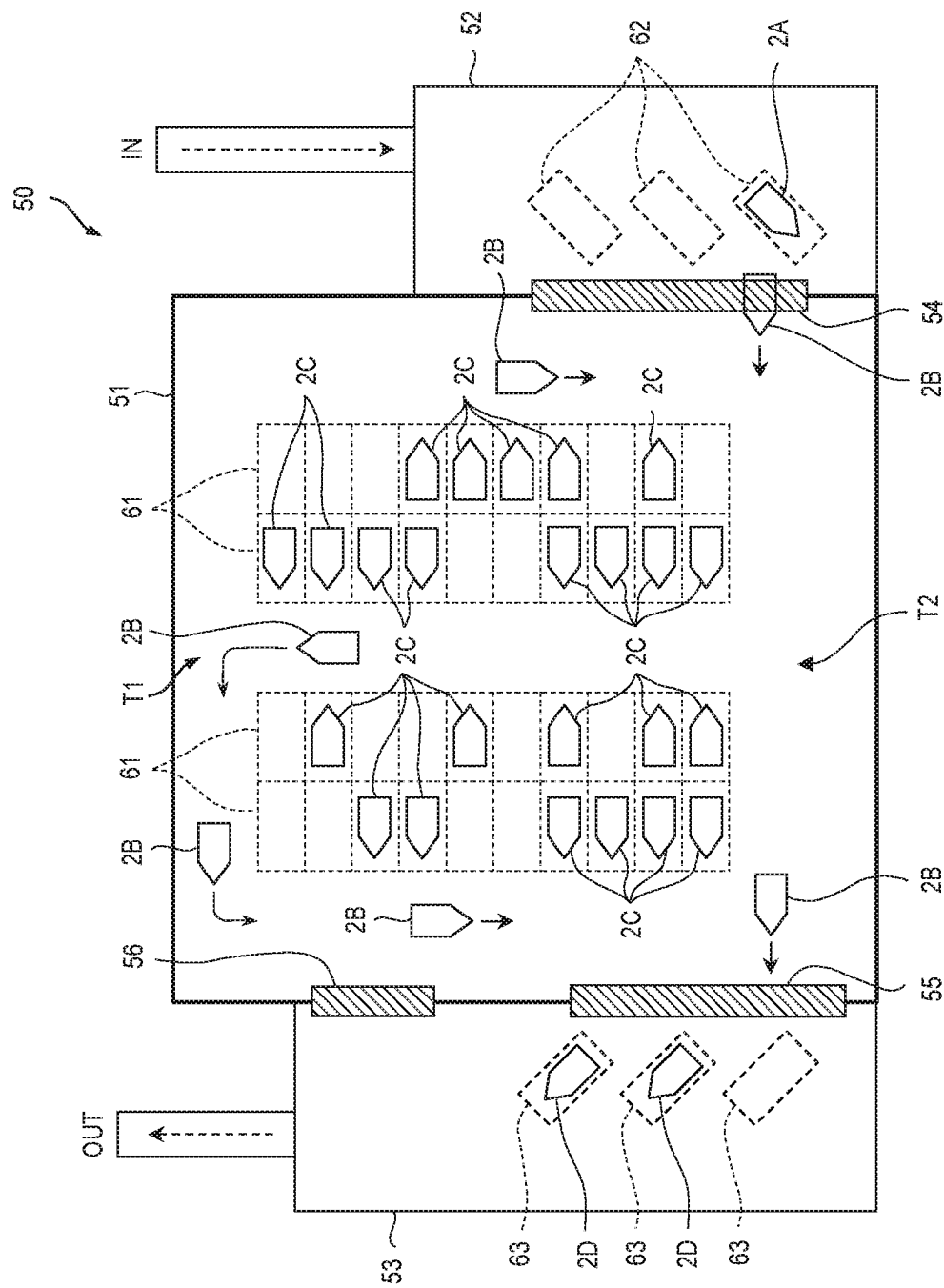
FIG. 2 is a plan view illustrating one example of a parking lot where automatic valet parking is performed.

FIG. 2 is a plan view illustrating one example of a parking lot where the automatic valet parking is performed. FIG. 2 shows a parking lot 50 for the automatic valet parking, a parking area 51, a drop-off area 52, and a pick-up area 53. The parking lot 50 includes the parking area 51, the drop-off area 52 and the pick-up area 53. The drop-off area 52 and the pick-up area 53 do not have to be provided separately, but may be provided as an integrated area.

The parking area 51 is a place where a parking space (parking frame) 61, in which the autonomous driving vehicle 2 is parked by the automatic valet parking, is formed. As shown in FIG. 2, for example, a plurality of parking spaces 61 is formed side by side in one direction (a vehicle width direction of the parked vehicle). The parking area 51 includes intersections T1 and T2. The intersections are locations at which a plurality of traveling paths intersects.

The drop-off area 52 is provided on an entrance side of the parking lot 50 and is a place where the occupant including the user alights from the autonomous driving vehicle 2 before entering the parking area. The drop-off area 52 has a drop-off space 62 for the autonomous driving vehicle 2 to stop when the occupant is to alight from the vehicle. The drop-off area 52 is connected to the parking area 51 via an entrance gate 54.

The pick-up area 53 is provided on an exit side of the parking lot 50 and is a place where the occupant boards the autonomous driving vehicle 2 that leaves the parking lot. The pick-up area 53 has a pick-up space 63 for the autonomous driving vehicle 2 to wait for the occupant to board the vehicle. The pick-up area 53 is connected to the parking area 51 via an exit gate 55. Further, a return gate 56 is provided between the pick-up area 53 and the parking area 51 for returning the autonomous driving vehicle 2 from the pick-up area 53 to the parking area 51. The return gate 56 is not essential.

In FIG. 2, the autonomous driving vehicles refer to an autonomous driving vehicle 2A stopped at the drop-off space 62 of the drop-off area 52, an autonomous driving vehicle 2B travelling within the parking lot 50, an autonomous driving vehicle 2C parked at the parking space 61 of the parking area 51, and an autonomous driving vehicle 2D parked at the pick-up space 63 of the pick-up area 53.

For example, after the autonomous driving vehicle 2 (corresponding to the autonomous driving vehicle 2A) that has entered the parking lot 50 drops off the occupant at the drop-off space 62, the automatic parking system 100 obtains the instruction authority for the autonomous driving vehicle 2 to start the automatic valet parking. The automatic parking system 100 causes the autonomous driving vehicle 2 (corresponding to the autonomous driving vehicle 2B) to travel toward the target parking space within the parking area 51, and the autonomous driving vehicle 2 (corresponding to the autonomous driving vehicle 2C) to be parked at the target parking space. The automatic parking system 100 causes the autonomous driving vehicle 2 (corresponding to the autonomous driving vehicle 2D) that is parked to travel toward the pick-up area 53 in response to a pick-up request and to wait at the pick-up space 63 for the occupant to arrive.

In the automatic parking system 100, in a case where the autonomous driving vehicle 2 becomes a failed vehicle due to abnormality or communication interruption during the automatic valet parking, an instruction change target vehicle is selected from the normal autonomous driving vehicles other than the failed vehicle, and an instruction for such a vehicle is changed. The failed vehicle is a vehicle in which automatic valet parking cannot be continuously performed due to the abnormality or the communication interruption. Details of the failed vehicle and the instruction change target vehicle will be described later.

Configuration of Automatic Parking System

Hereinafter, a configuration of the automatic parking system 100 will be described with reference to the drawings. As shown in FIG. 1, the automatic parking system 100 includes the parking lot management server 1. The parking lot management server 1 is a server for managing the parking lot.

The parking lot management server 1 is configured to communicate with the autonomous driving vehicle 2 and a user terminal 3. Details of the autonomous driving vehicle 2 and the user terminal 3 will be described later. The parking lot management server 1 may be provided in the parking lot or may be provided in a facility away from the parking lot. The parking lot management server 1 may be configured by a plurality of computers provided at different locations.

The parking lot management server 1 is connected to a parking lot sensor 4 and a parking lot map database 5. The parking lot sensor 4 is a sensor for recognizing a situation in the parking lot 50. The parking lot sensor 4 includes a vacancy sensor for detecting whether there is a parked vehicle in each parking space (whether each parking space is full or vacant).

The vacancy sensor may be provided for each parking space, or may be provided on, for example, a ceiling so as to be able to monitor a plurality of parking spaces with a single sensor. A configuration of the vacancy sensor is not particularly limited, and other known configurations can be adopted. The vacancy sensor may be a pressure sensor, a radar sensor or a sonar sensor using radio waves, or a camera. The vacancy sensor transmits detected information of the parked vehicle in the parking space to the parking lot management server 1.

The parking lot sensor 4 may include a surveillance camera for detecting the autonomous driving vehicle 2 traveling on a traveling path of the parking lot 50. The surveillance camera is provided on a ceiling or a wall of the parking lot, and captures an image of the autonomous driving vehicle 2 while traveling. The surveillance camera transmits the captured image to the parking lot management server 1.

The parking lot map database 5 is a database that records parking lot map information. The parking lot map information includes location information of the parking space within the parking lot, location information of the drop-off space, location information of the pick-up space, and information on the traveling path within the parking lot. Further, the parking lot map information includes location information of the landmark used by the autonomous driving vehicle 2 for location recognition. The landmark will be described later.

Figure 3:
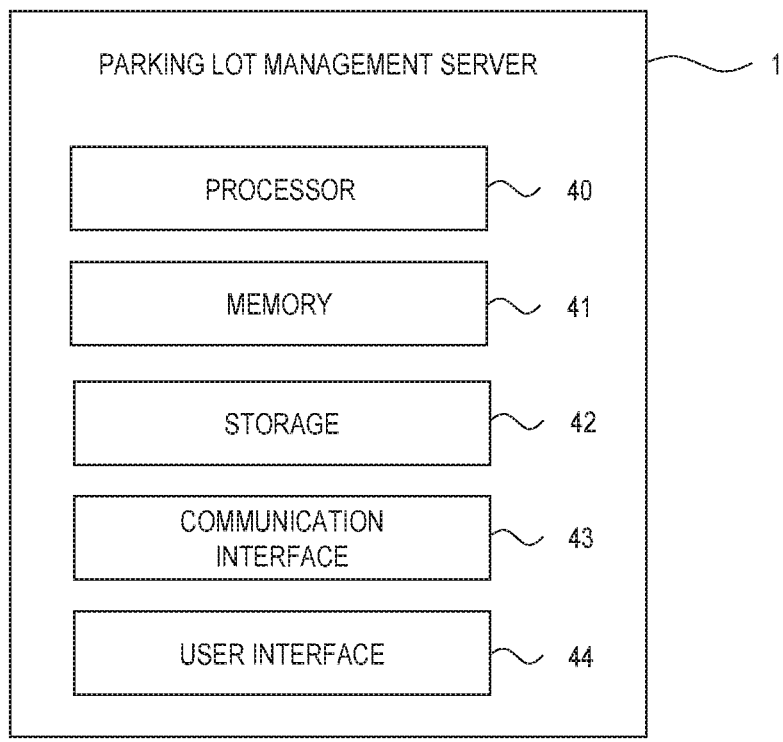
FIG. 3 is a block diagram illustrating one example of a hardware configuration of a parking lot management server.

A hardware configuration of the parking lot management server 1 will be described. FIG. 3 is a block diagram illustrating one example of a hardware configuration of the parking lot management server. As shown in FIG. 3, the parking lot management server 1 is configured as a general computer including a processor 40, a memory 41, a storage 42, a communication interface 43 and a user interface 44.

The processor 40 controls the parking lot management server 1 by operating various operating systems. The processor 40 is an arithmetic unit such as a central processing unit (CPU) including a control device, an arithmetic device, and a register. The processor 40 collectively controls the memory 41, the storage 42, the communication interface 43, and the user interface 44. The memory 41 is a recording medium such as a read only memory (ROM), a random access memory (RAM), or the like. The storage 42 is a recording medium such as a hard disk drive (HDD).

The communication interface 43 is a communication device for performing wireless communication via a network. Examples of the communication interface 43 include a network device, a network controller, a network card, and the like. The parking lot management server 1 communicates with the autonomous driving vehicle 2 and the user terminal 3 using the communication interface 43. The user interface 44 is an input/output unit of the parking lot management server 1 used by, for example, an administrator of the parking lot management server 1. The user interface 44 includes an output device such as a display and a speaker, and an input device such as a touchscreen.

A functional configuration of the parking lot management server 1 will be described. As illustrated in FIG. 1, the parking lot management server 1 includes a vehicle information acquisition unit 11, a vehicle situation recognition unit 12, an instruction change target vehicle specifying unit 13, a vehicle instruction unit 14, and a user notification unit 15.

The vehicle information acquisition unit 11 acquires vehicle information of the autonomous driving vehicle 2 through communication with the autonomous driving vehicle 2 subject to the automatic valet parking. The vehicle information includes identification information of the autonomous driving vehicle 2 and location information of the autonomous driving vehicle 2 within the parking lot. The identification information may be any information as long as it can identify each of the autonomous driving vehicles 2. The identification information may be, for example, an ID number, a vehicle number, or a reservation number for the automatic valet parking.

The vehicle information may include the type of the autonomous driving vehicle 2 or may include a vehicle number separately from the identification information. The vehicle information may include entry reservation information such as an entry reservation time, or may include an exit reservation time. The vehicle information may include vehicle body information such as a turning radius and a vehicle width of the autonomous driving vehicle 2, or may include information on the automatic driving function of the autonomous driving vehicle 2. The information on the automatic driving function may include version information of the automatic driving.

Further, the vehicle information may include recognition results of the external environment and traveling state of the autonomous driving vehicle 2. The recognition of the external environment and the traveling state will be described later. The vehicle information may include information on remaining mileage or remaining fuel of the autonomous driving vehicle 2. The vehicle information may include failure information of the autonomous driving vehicle 2. The failure information is information on abnormality that has occurred in the autonomous driving vehicle 2.

The failure information includes information on causes of the abnormality of the autonomous driving vehicle 2. Causes of the abnormality include at least one of power failure, brake failure, steering failure, accelerator failure, external sensor failure, internal sensor failure, electronic control unit (ECU) failure, Controller Area Network (CAN) failure, and shift failure of the autonomous driving vehicle 2.

The power failure includes main power failure. The power failure may include failure of a second power supply (failure of the second power supply alone). The brake failure includes main brake failure. The brake failure may include failure of a redundant brake system. The external sensor failure includes at least one of camera failure, sonar sensor failure, and radar sensor failure. The internal sensor failure includes at least one of vehicle speed sensor failure, acceleration sensor failure, and yaw rate sensor failure. The ECU failure includes at least one of failure related to the automatic driving function, failure related to the clearance sonar, and failure related to the camera. The shift failure includes main shift failure. The shift failure may also include redundancy shift failure.

The failure information does not have to include information on the failure that does not affect the subsequent automatic valet parking. The failure information does not have to include information on the causes of the abnormality, and may include only information on a state of the autonomous driving vehicle 2 such as automatic driving inability. The vehicle information acquisition unit 11 continuously acquires the vehicle information from the autonomous driving vehicle 2 during the automatic valet parking.

The vehicle situation recognition unit 12 recognizes the situation of the autonomous driving vehicle 2 during the automatic valet parking based on the vehicle information acquired by the vehicle information acquisition unit 11. The situation of the autonomous driving vehicle 2 includes a location of the autonomous driving vehicle 2 within the parking lot. The situation of the autonomous driving vehicle 2 includes a communication status between the parking lot management server 1 and the autonomous driving vehicle 2. The vehicle situation recognition unit 12 may recognize the situation of the autonomous driving vehicle 2 based on captured images of the autonomous driving vehicle 2 transmitted from the parking lot sensor 4.

The vehicle situation recognition unit 12 determines whether or not the abnormality has occurred in the autonomous driving vehicle 2 during the automatic valet parking based on the vehicle information acquired by the vehicle information acquisition unit 11. The abnormality means failure that affects the subsequent automatic valet parking. The abnormality includes abnormality related to the automatic driving traveling and abnormality related to the automatic driving parking.

The abnormality related to the automatic driving traveling are failures that cause the autonomous driving vehicle 2 to be in a state where it cannot be stopped, a state where it cannot turn, a state where it cannot run, and a state where traveling control is unavailable. The abnormality in which the autonomous driving vehicle 2 cannot be stopped includes the power failure and the brake failure of the autonomous driving vehicle 2. The abnormality in which the autonomous driving vehicle 2 cannot turn includes the steering failure of the autonomous driving vehicle 2. The abnormality in which the autonomous driving vehicle 2 cannot run includes the accelerator failure. The abnormality in which traveling control is unavailable includes the external sensor failure, the internal sensor failure, the ECU failure and the CAN failure. It is not necessary to include failure that does not affect the automatic driving traveling.

The abnormality related to the automatic driving parking is failures in which the autonomous driving vehicle 2 cannot be parked in the parking space with appropriate accuracy due to the sensor failure or the like. The abnormality related to the automatic driving parking includes at least one of the external sensor failure, the internal sensor failure, and the shift failure. For example, in a case where the sonar sensor failure occurs in the autonomous driving vehicle 2 that requires the sonar sensor for the automatic driving parking, it is determined that the abnormality relate to the automatic driving parking. It is not necessary to include failure that does not affect the automatic driving parking.

The autonomous driving vehicle 2 performs emergency stop and provides the vehicle information including the failure information related to the abnormality to the parking lot management server 1 in a case where the abnormality is recognized. In a case where the autonomous driving vehicle 2 cannot be stopped, the autonomous driving vehicle 2 performs the emergency stop by stopping supply of the driving force to the tires. The autonomous driving vehicle 2 stops or evacuates according to the instruction from the parking lot management server 1.

The vehicle situation recognition unit 12 may determine that abnormality that is not recognized by the autonomous driving vehicle 2 have occurred. The vehicle situation recognition unit 12 may determine that the abnormality has occurred in the autonomous driving vehicle 2 during the automatic valet parking based on, for example, information on the traveling state of the autonomous driving vehicle 2 (e.g. vehicle speed information) included in the vehicle information, in a case where the autonomous driving vehicle 2 is stopped for a certain period of time even though the vehicle instruction unit 14, described later, transmits an advance instruction.

The vehicle situation recognition unit 12 may determine that the abnormality has occurred in the autonomous driving vehicle 2 in a case where a location of the autonomous driving vehicle 2 estimated based on the detection result of the parking lot sensor 4 (for example, captured images of the autonomous driving vehicle 2) is apart, by a certain distance, from a location of the autonomous driving vehicle 2 in the vehicle information transmitted from the autonomous driving vehicle 2.

The vehicle situation recognition unit 12 may determine that the abnormality has occurred in the autonomous driving vehicle 2 in a case where a difference between the speed of the autonomous driving vehicle 2 estimated based on the detection result of the parking lot sensor 4 and speed of the autonomous driving vehicle 2 in the vehicle information transmitted from the autonomous driving vehicle 2 is equal to or larger than a vehicle speed threshold. The vehicle speed threshold is a threshold of a preset value. Acceleration may be used instead of the vehicle speed. The vehicle situation recognition unit 12 may determine that the abnormality has occurred in the autonomous driving vehicle 2 by comparing orientation of the autonomous driving vehicle 2 estimated based on the detection result of the parking lot sensor 4 and a steering angle in the vehicle information.

Further, the vehicle situation recognition unit 12 may determine that the abnormality has occurred in the autonomous driving vehicle 2 in a case where it is recognized that the autonomous driving vehicle 2 has veered from the target route based on the detection result of the parking lot sensor 4 or the vehicle information transmitted from the autonomous driving vehicle 2. The vehicle situation recognition unit 12 may determine that the abnormality has occurred in the autonomous driving vehicle 2 in a case where a difference between a target steering angle directed by the vehicle instruction unit 14 described later and a steering angle (actual steering angle) of the autonomous driving vehicle 2 in the vehicle information transmitted from the autonomous driving vehicle 2 is equal to or larger than a steering angle instruction threshold. The steering angle instruction threshold is a threshold of a preset value. Acceleration or vehicle speed may be used instead of the steering angle. In a case where it is determined that the abnormality has occurred, the vehicle situation recognition unit 12 recognizes that the autonomous driving vehicle 2 has become a failed vehicle due to the abnormality.

In addition, the vehicle situation recognition unit 12 determines whether or not the communication between the parking lot management server 1 and the autonomous driving vehicle 2 has been interrupted. A method for determining whether communication has been interrupted is not particularly limited, and other known methods can be adopted. For example, in a case where a situation in which the communication with the autonomous driving vehicle 2 is unavailable for at least a certain period of time, the vehicle situation recognition unit 12 determines that the communication has been interrupted. The vehicle situation recognition unit 12 may determine that the communication has been interrupted in a case where a situation in which a communication speed with the autonomous driving vehicle 2 is less than an interruption determination threshold has continued for at least a certain period of time. The interruption determination threshold is a threshold of a preset value. In a case where it is determined that the communication has been interrupted, the vehicle situation recognition unit 12 recognizes that the autonomous driving vehicle 2 has become a failed vehicle due to the communication interruption.

In a case where the vehicle situation recognition unit 12 recognizes that a failed vehicle exists due to the abnormality or the communication interruption, the instruction change target vehicle specifying unit 13 specifies an instruction change target vehicle, based on parking lot map information stored in the parking lot map database 5, a location of the failed vehicle, and locations of normal autonomous driving vehicles each of which is an autonomous driving vehicle 2 other than the failed vehicle, from among the normal autonomous driving vehicles.

The location of the failed vehicle is a location of the failed vehicle within the parking lot, which is recognized based on the vehicle information transmitted from the autonomous driving vehicle 2 (failed vehicle) when the failure (abnormality or communication interruption) occurs, or alternatively, immediately before the failure occurs. The normal autonomous driving vehicle is the autonomous driving vehicle 2 that can run according to the instruction from the parking lot management server 1, in which the failure has not occurred. The normal autonomous driving vehicles may include the autonomous driving vehicle 2 that is parked. The location of the normal autonomous driving vehicle is a location of the normal autonomous driving vehicle in the parking lot, which is recognized based on the vehicle information transmitted from the normal autonomous driving vehicle. The instruction change target vehicle is a normal autonomous driving vehicle for which the instruction will be changed due to the failed vehicle.

The instruction change target vehicle specifying unit 13 sets a target area in the parking lot based on the parking lot map information and the location of the failed vehicle. The target area is an area used for specifying the instruction change target vehicle. The instruction change target vehicle specifying unit 13 may set, for example, an area from the location of the failed vehicle to an intersection one section behind the failed vehicle as the target area. The target area is set for each failed vehicle.

"Behind the failed vehicle" means "behind a traveling direction (forward direction) of the traveling path on which the failed vehicle is located." The information on the traveling direction on the traveling path is included in, for example, the parking lot map information. The instruction change target vehicle specifying unit 13 may estimate the traveling direction of the traveling path on which the failed vehicle is located based on a past temporal change in the location of the failed vehicle.

The instruction change target vehicle specifying unit 13 may specify, for example, the normal autonomous driving vehicle included in the target area as the instruction change target vehicle based on the target area and the location of the normal autonomous driving vehicle. The instruction change target vehicle specifying unit 13 may specify the normal autonomous driving vehicle expected to enter the target area as the instruction change target vehicle based on the target area and the target route of the normal autonomous driving vehicle.

Figure 4:
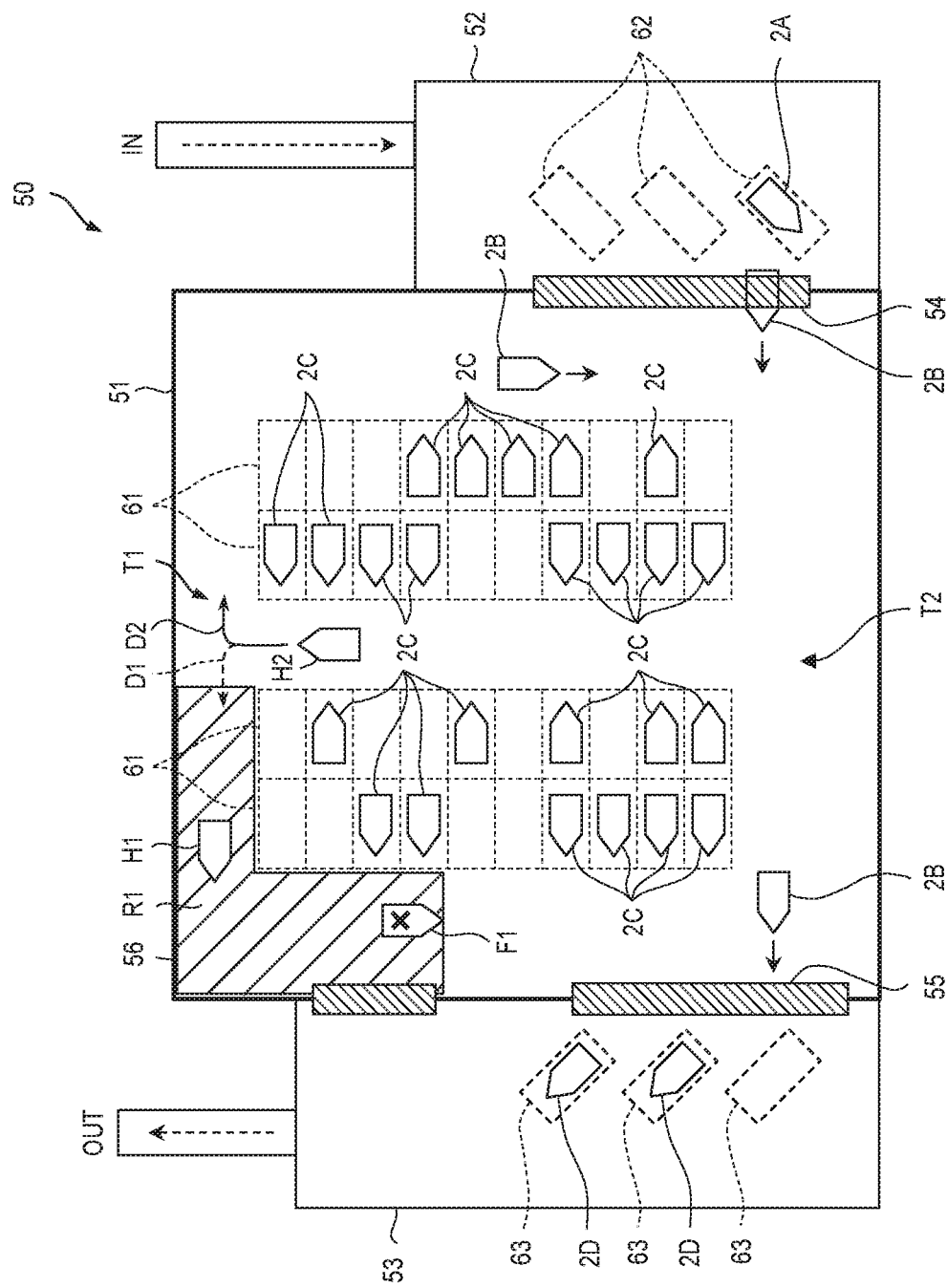
FIG. 4 is a plan view illustrating one example of specifying an instruction change target vehicle using a target area.

FIG. 4 is a plan view illustrating one example of specifying the instruction change target vehicle using the target area. Since the parking lot 50 shown in FIG. 4 is the same as that in FIG. 3, the same descriptions will be omitted. FIG. 4 shows a failed vehicle F1 and instruction change target vehicles H1 and H2. FIG. 4 shows a target area R1, a target route D1 before changing a route of the instruction change target vehicle H2, and a target route D2 after changing a route of the instruction change target vehicle H2.

In the situation shown in FIG. 4, the instruction change target vehicle specifying unit 13 sets an area from the location of the failed vehicle F1 to an intersection T1 one section behind the failed vehicle F1 as a target area R1. The instruction change target vehicle specifying unit 13 may specify, for example, the normal autonomous driving vehicle H1 located in the target area R1 as the instruction change target vehicle H1. The instruction change target vehicle specifying unit 13 specifies a normal autonomous driving vehicle H2 expected to enter the target area R1 as the instruction change target vehicle H2.

The vehicle instruction unit 14 issues an instruction to the autonomous driving vehicle 2 that performs the automatic valet parking. In a case where the autonomous driving vehicle 2 starts the automatic valet parking, the vehicle instruction unit 14 instructs the target route for the autonomous driving vehicle 2 to reach the target parking space. A method for determining the target parking space is not particularly limited. The parking space may be allocated from the exit side in the order in which the vehicle enter the parking lot, or the parking space may be allocated from the exit side in order of a departure reservation time. The target parking space may be designated by the user.

The vehicle instruction unit 14 does not have to instruct all target routes from the current location of the autonomous driving vehicle 2 to the target parking space for the autonomous driving vehicle 2 at once, but may have a function to instruct a part of the target route for the autonomous driving vehicle 2. Further, the vehicle instruction unit 14 instructs the target route to reach the pick-up space 63 when the autonomous driving vehicle leaves the parking lot.

The vehicle instruction unit 14 calculates a target route with which the autonomous driving vehicle 2 reaches the target parking space from the location of the autonomous driving vehicle 2. The vehicle instruction unit 14 may calculate, for example, a route by which the vehicle can reach the target parking space with the shortest travel distance along the traveling path within the parking lot as the target route. The vehicle instruction unit 14 may calculate a new target route of the autonomous driving vehicle 2 so as not to intersect with the target route of another autonomous driving vehicle 2. The vehicle instruction unit 14 may determine the target parking space in consideration of the target route. The vehicle instruction unit 14 may also instruct an upper limit vehicle speed within the parking lot as well as the target route. The vehicle instruction unit 14 may instruct an upper limit acceleration. The upper limit vehicle speed and the upper limit acceleration are preset values.

The vehicle instruction unit 14 issues a pause instruction and an advance instruction according to the situation of the other autonomous driving vehicles 2 recognized by the vehicle situation recognition unit 12. The pause instruction is an instruction to pause the autonomous driving vehicle 2. The advance instruction is an instruction to advance (start) the stopped autonomous driving vehicle 2. The vehicle instruction unit 14 may issue an instruction to decelerate or accelerate of the autonomous driving vehicle 2. The vehicle instruction unit 14 controls the stop and the advance of the autonomous driving vehicle 2 according to the situation of the autonomous driving vehicle 2 so that the autonomous driving vehicle 2 can travel to the target parking space while avoiding approaching other autonomous driving vehicles 2. In the present embodiment, the vehicle instruction unit 14 does not have to issue the pause instruction or the advance instruction.

In a case where the autonomous driving vehicle 2 recognizes abnormality and requests evacuation guidance, the vehicle instruction unit 14 directs the failed vehicle to an evacuation space. The vehicle instruction unit 14 performs the evacuation guidance using the nearest parking space, the side of the traveling path, or the like as the evacuation space. The evacuation space may be set so as to be a location over two adjacent parking spaces instead of a single parking space.

In a case where it is determined that the autonomous driving vehicle 2 becomes a failed vehicle due to the abnormality, not by the autonomous driving vehicle 2 but by the vehicle situation recognition unit 12, the vehicle instruction unit 14 issues the emergency stop instruction to the failed vehicle. In this case, the failed vehicle stops at the current location. The vehicle instruction unit 14 may perform the evacuation guidance to the evacuation space depending on the situation of the failed vehicle.

The vehicle instruction unit 14 issues, in a case where the instruction change target vehicle is specified by the instruction change target vehicle specifying unit 13 from among the normal autonomous driving vehicles other than the failed vehicle, a route change instruction, an evacuation instruction, or a stop instruction to the instruction change target vehicle, such that the instruction change target vehicle gets away from the failed vehicle.

The route change instruction to get away from the failed vehicle is an instruction to change the target route of the instruction change target vehicle so as to get away from the failed vehicle. The vehicle instruction unit 14 instructs to, for example, change the target route including the traveling path where the failed vehicle is located to the target route not including the traveling path to the failed vehicle. The vehicle instruction unit 14 may instruct to change the target route that enters the target area to the target route that does not enter the target area. The vehicle instruction unit 14 may instruct to change the target route of the instruction change target vehicle such that the target route is a target route (detour route) away from the failed vehicle by at least a certain distance.

The evacuation instruction is an instruction for evacuating to a location where the instruction change target vehicle does not interfere with the failed vehicle's travel, such as a vacant parking space or a side of the traveling path. The vehicle instruction unit 14 may issue the evacuation instruction that the instruction change target vehicle evacuates to a location across two adjacent parking spaces instead of a single parking space. The vehicle instruction unit 14 may issue the evacuation instruction that the instruction change target vehicle evacuates to a parking space where two adjacent, i.e.

both the left and right sides, parking spaces are vacant (that is, the middle parking space of the three vacant parking spaces). In the situation shown in FIG. 4, the vehicle instruction unit 14 may issue the evacuation instruction that the instruction change target vehicle H1 moves so as to stop next to the return gate 56 (pick-up area 53) on the traveling path.

In the evacuation instruction, the instruction change target vehicle stops after evacuation. In a case where it is determined, by the parking lot sensor 4 (vacancy sensor or surveillance camera), that the failed vehicle has been parked in the target parking space or the failed vehicle has been away from the instruction change target vehicle by a certain distance, the vehicle instruction unit 14 may cancel the evacuation instruction and allow the instruction change target vehicle to return to the target route. The vehicle instruction unit 14 may notify an administrator of the parking lot that there is a failed vehicle, and the administrator may determine whether the instruction change target vehicle can return to the target route or not.

The stop instruction is an instruction to stop the instruction change target vehicle. The stop instruction may be have the same content as an instruction to stop the vehicle. In a case where the instruction change target vehicle leaves the parking lot but cannot reach the pick-up area without passing through the failed-vehicle route, the vehicle instruction unit 14 issues the stop instruction to the instruction change target vehicle. In a case where it is determined, by the parking lot sensor 4, that the failed vehicle has been parked or the failed vehicle has been apart from the instruction change target vehicle by a certain distance, the vehicle instruction unit 14 may cancel the stop instruction and allow the instruction change target vehicle to return to the target route. The vehicle instruction unit 14 may notify an administrator of the parking lot of that there is a failed vehicle, and the administrator may determine whether the instruction change target vehicle can return to the target route or not.

The vehicle instruction unit 14 may select the instruction based on the parking lot map information and the location of the failed vehicle, or alternatively, the location of the normal autonomous driving vehicle with respect to the target area. In the situation shown in FIG. 4, the vehicle instruction unit 14 issues the stop instruction or the evacuation instruction to the instruction change target vehicle H1 in which a path ahead is obstructed by the failed vehicle F1. The vehicle cannot pass the return gate 56 from a side of the parking area 51.

The vehicle instruction unit 14 may issue, for example, the stop instruction to the instruction change target vehicle H1. The instruction change target vehicle H1 stops at a place according to the stop instruction. The vehicle instruction unit 14 may issue the evacuation instruction to the instruction change target vehicle H1. The vehicle instruction unit 14 allows the instruction change target vehicle H1 to evacuate since the failed vehicle F1 may suddenly retreat. The vehicle instruction unit 14 allows the instruction change target vehicle H1 to retreat (evacuate) by a certain distance and then to stop, for example, such that the instruction change target vehicle does not to enter a straight line extending backward from the failed vehicle F1. Alternatively, the vehicle instruction unit 14 allows the instruction change target vehicle H1 to evacuate to the nearest parking space 61. The evacuation space may be directed as a location over two adjacent parking spaces 61 instead of a single parking space 61.

In the situation shown in FIG. 4, the vehicle instruction unit 14 issues the route change instruction or the stop instruction to the instruction change target vehicle H2 expected to enter the target area R1 of the failed vehicle F1. The vehicle instruction unit 14 changes the target route D1 of the instruction change target vehicle H2 to the target route D2 that does not enter the target area R1.

In a case where there is a route by which the instruction change target vehicle H2 can reach the target parking space without entering the target area R1, the vehicle instruction unit 14 issues the route change instruction using such a route as the target route of the instruction change target vehicle H2. In a case where there is no route by which the instruction change target vehicle H2 can reach the target parking space without entering the target area R1, the vehicle instruction unit 14 issues the route change instruction that includes an instruction to change the target parking space. The vehicle instruction unit 14 may issue the stop instruction to the instruction change target vehicle H2. In this case, the instruction change target vehicle H2 stops at the current location.

The user notification unit 15 performs various notifications to the user terminal 3 of the user of the autonomous driving vehicle 2 during the automatic valet parking. In a case where the autonomous driving vehicle 2 leaves and arrives at the pick-up space 63 of the pick-up area 53 according to the pick-up request, the user notification unit 15 notifies the user terminal 3 of the user of the autonomous driving vehicle 2 of arrival.

The user notification unit 15 transmits, in a case where the instruction change target vehicle to which the evacuation instruction or the stop instruction has been transmitted is leaving the parking lot, a notification that the autonomous driving vehicle has stopped leaving the parking lot to the user terminal 3 of the user of the instruction change target vehicle. The term "the vehicle is leaving the parking lot" means, for example, a period from when the autonomous driving vehicle 2 parked in the parking space 61 starts traveling according to the pick-up request until it arrives at the pick-up space 63. The notification indicating that the vehicle has stopped leaving the parking lot means a notification for notifying the user that the autonomous driving vehicle 2 (instruction change target vehicle) cannot reach the pick-up space 63.

The user notification unit 15 may notify regarding the reason why the vehicle has to stop leaving in the notification that the vehicle has stopped leaving the parking lot. The user notification unit 15 may notify the user that the autonomous driving vehicle 2 has stopped leaving the parking lot due to the failed vehicle.

The user notification unit 15 transmits, in a case where the evacuation instruction or the stop instruction of the instruction change target vehicle that is notified that the vehicle has stopped leaving the parking lot has been canceled, a notification that the vehicle is ready to leave the parking lot again to the user terminal 3 of the user of the instruction change target vehicle. The notification indicating that the vehicle is ready to leave the parking lot again means a notification for notifying the user that the autonomous driving vehicle 2 (instruction change target vehicle) starts to autonomously travel toward the pick-up space 63.

The user notification unit 15 may notify the user terminal, of the user of the autonomous driving vehicle 2 that has become the failed vehicle, that the failure has occurred. In a case where the abnormality is specifically recognized, the user notification unit 15 may notify the user of the type of abnormality.

Next, the autonomous driving vehicle 2 and the user terminal 3, which communicate with the parking lot management server 1, will be described. The automatic parking system 100 according to the present embodiment does not have to include the autonomous driving vehicle 2 and the user terminal 3.

As shown in FIG. 1, the autonomous driving vehicle 2 has an automatic driving ECU 20 as one example. The automatic driving ECU 20 is an electronic control unit having a CPU, a ROM, a RAM, and the like. In the automatic driving ECU 20, for example, a program recorded in the ROM is loaded into the RAM, and various functions are implemented by executing the program loaded into the RAM by the CPU. The automatic driving ECU 20 may be configured by a plurality of electronic units.

The automatic driving ECU 20 is connected to a communication unit 21, an external sensor 22, an internal sensor 23, and an actuator 24.

The communication unit 21 is a communication device that controls wireless communication with the outside of the autonomous driving vehicle 2. The communication unit 21 transmits and receives various types of information via communication with the parking lot management server 1. The communication unit 21 may transmit, for example, the vehicle information to the parking lot management server 1 and acquires information (for example, information of landmarks along the target route) required for the automatic valet parking from the parking lot management server 1. Further, the communication unit 21 communicates with the user terminal 3 associated with the autonomous driving vehicle 2.

The external sensor 22 is an in-vehicle sensor that detects an external environment of the autonomous driving vehicle 2. The external sensor 22 includes at least a camera. The camera is an imaging device that captures images of the external environment of the autonomous driving vehicle 2. The camera may be provided, for example, behind a windshield of the autonomous driving vehicle 2 and captures images of the front of the vehicle. The camera transmits imaging information on the external environment of the autonomous driving vehicle 2 to the automatic driving ECU 20. The camera may be a monocular camera or a stereo camera. A plurality of cameras may be provided, and images of the left and right sides and the back of the autonomous driving vehicle 2 may be captured in addition to the front of the vehicle.

The external sensor 22 may include a radar sensor. The radar sensor is a detection device that detects an object around the autonomous driving vehicle 2 using radio waves (for example, millimeter waves) or light. The radar sensor may include, for example, a millimeter-wave radar or a LIDAR (Light Detection and Ranging). The radar sensor transmits an electric wave or light to the surroundings of the autonomous driving vehicle 2 and detects an object by receiving the electric wave or light reflected by the object. The radar sensor transmits the detected object information to the automatic driving ECU 20. Further, the external sensor 22 may include a sonar sensor that detects a sound outside the autonomous driving vehicle 2.

The internal sensor 23 is an in-vehicle sensor that detects a traveling state of the autonomous driving vehicle 2. The internal sensor 23 includes a vehicle speed sensor, an acceleration sensor, and a yaw rate sensor. The vehicle speed sensor is a detector that detects vehicle speed of the autonomous driving vehicle 2. As the vehicle speed sensor, a wheel speed sensor that is provided for a wheel of the autonomous driving vehicle 2 or a drive shaft that rotates integrally with the wheel and detects rotation speed of each wheel can be used. The vehicle speed sensor transmits the detected vehicle speed information (wheel speed information) to the automatic driving ECU 20.

The acceleration sensor is a detector that detects acceleration of the autonomous driving vehicle 2. The acceleration sensor may include, for example, a longitudinal acceleration sensor that detects the longitudinal acceleration of the autonomous driving vehicle 2. The acceleration sensor may include a lateral acceleration sensor that detects the lateral acceleration of the autonomous driving vehicle 2. The acceleration sensor may transmit, for example, acceleration information of the autonomous driving vehicle 2 to the automatic driving ECU 20. The yaw rate sensor is a detector that detects a yaw rate (rotational angular velocity) around a vertical axis of the center of gravity of the autonomous driving vehicle 2. For example, a gyro sensor can be used as the yaw rate sensor. The yaw rate sensor transmits the detected yaw rate information of the autonomous driving vehicle 2 to the automatic driving ECU 20.

The actuator 24 is a device used for controlling the autonomous driving vehicle 2. The actuator 24 includes at least a drive actuator, a brake actuator, and a steering actuator. The drive actuator controls the amount of air supplied to the engine (throttle opening degree) according to a control signal from the automatic driving ECU 20 and controls the driving force of the autonomous driving vehicle 2. In a case where the autonomous driving vehicle 2 is a hybrid vehicle, a control signal from the automatic driving ECU 20 is input to a motor as a power source in addition to the air supplied to the engine to control the driving force. In a case where the autonomous driving vehicle 2 is an electric vehicle, the control signal from the automatic driving ECU 20 is input to the motor as the power source to control the driving force. The actuator 24 is configured by the motor as the power source in these cases.

The brake actuator controls a brake system according to the control signal from the automatic driving ECU 20 and controls the braking force applied to the wheels of the autonomous driving vehicle 2. Examples of the brake system include a hydraulic brake system. The steering actuator controls driving of an assist motor for controlling the steering torque in the electric power steering system according to the control signal from the automatic driving ECU 20. Accordingly, the steering actuator controls the steering torque of the autonomous driving vehicle 2.

One example of a functional configuration of the automatic driving ECU 20 will be described. The automatic driving ECU 20 includes an external environment recognition unit 31, a traveling state recognition unit 32, a vehicle location recognition unit 33, a vehicle information providing unit 34, and a vehicle control unit 35.

The external environment recognition unit 31 recognizes the external environment of the autonomous driving vehicle 2 based on the detection results of the external sensor 22 (an image captured by the camera or object information detected by the radar sensor). The external environment includes a relative location of a surrounding object with respect to the autonomous driving vehicle 2. The external environment may include a relative speed and a moving direction of a surrounding object with respect to the autonomous driving vehicle 2. The external environment recognition unit 31 recognizes objects such as other vehicles or parking lot pillars by, for example, pattern matching. The external environment recognition unit 31 may recognize, for example, a parking lot gate, parking lot walls, poles and safety cones. In addition, the external environment recognition unit 31 may recognize a traveling boundary in the parking lot by white line recognition.

The traveling state recognition unit 32 recognizes the traveling state of the autonomous driving vehicle 2 based on the detection results of the internal sensor 23. The traveling state includes the vehicle speed of the autonomous driving vehicle 2, the acceleration of the autonomous driving vehicle 2, and the yaw rate of the autonomous driving vehicle 2. Specifically, the traveling state recognition unit 32 recognizes the vehicle speed of the autonomous driving vehicle 2 based on the vehicle speed information of the vehicle speed sensor. The traveling state recognition unit 32 recognizes the acceleration of the autonomous driving vehicle 2 based on the vehicle speed information of the acceleration sensor. The traveling state recognition unit 32 recognizes the orientation of the autonomous driving vehicle 2 based on the yaw rate information of the yaw rate sensor.

The vehicle location recognition unit 33 recognizes the location of the autonomous driving vehicle 2 within the parking lot based on the parking lot map information obtained from the parking lot management server 1 through the communication unit 21 and the external environment recognized by the external environment recognition unit 31.

The vehicle location recognition unit 33 recognizes the location of the autonomous driving vehicle 2 within the parking lot based on location information of the landmark within the parking lot included in the parking lot map information and relative location of the landmark for the autonomous driving vehicle 2 recognized by the external environment recognition unit 31. Fixed objects provided in the parking lot can be used as the landmark. At least one of, for example, parking lot pillars, parking lot walls, poles and safety cones is used as the landmark. A travel boundary may be used as the landmark.

Alternatively, the vehicle location recognition unit 33 may recognize the location of the autonomous driving vehicle 2 by dead reckoning based on the detection results of the internal sensor 23. Further, the vehicle location recognition unit 33 may recognize the location of the autonomous driving vehicle 2 by communicating with a beacon installed in the parking lot.

The vehicle information providing unit 34 provides the vehicle information to the parking lot management server 1 through the communication unit 21. The vehicle information providing unit 34 provides, to the parking lot management server 1, for example, the vehicle information including the information on the location of the autonomous driving vehicle 2 within the parking lot recognized by the vehicle location recognition unit 33 at regular intervals.

The vehicle information providing unit 34 provides the vehicle information including the failure information related to the abnormality to the parking lot management server 1 in a case where the abnormality is detected. A method for detecting the abnormality (various failures) is not particularly limited, and other known methods can be adopted.

The vehicle control unit 35 executes the automatic driving of the autonomous driving vehicle 2. In the automatic driving, the autonomous driving vehicle 2 autonomously travels along the target route instructed by the parking lot management server 1. The vehicle control unit 35 generates a course of the autonomous driving vehicle 2 based on, for example, the target route, the location of the autonomous driving vehicle 2, the external environment of the autonomous driving vehicle 2, and the traveling state of the autonomous driving vehicle 2. The course corresponds to a travel plan for automatic driving. The course includes a path along which the vehicle travels during the automatic driving and a vehicle speed plan in the automatic driving.

The path is a trajectory along which the vehicle autonomously travels on the target route. The path can be, for example, data (steering angle plan) indicating change in the steering angle of the autonomous driving vehicle 2 according to a position on the target route. The position on the target route may be, for example, a set vertical position set at predetermined intervals (for example, 1 m) in the traveling direction of the target route. The steering angle plan is data in which a target steering angle is associated with each set vertical position.

The vehicle control unit 35 generates the course so as to, for example, pass through the center of the traveling path of the parking lot along the target route. In a case where the upper limit vehicle speed is instructed from the parking lot management server 1, the vehicle control unit 35 generates the course such that the vehicle speed plan does not exceed the upper limit vehicle speed. The vehicle control unit 35 may generate the course using the parking lot map information acquired by communicating with the parking lot management server 1.

In a case where the pause instruction is received from the parking lot management server 1, the vehicle control unit 35 stops the autonomous driving vehicle 2. In a case where the advance instruction is received from the parking lot management server 1, the vehicle control unit 35 advances the autonomous driving vehicle 2. One example of the configuration of the autonomous driving vehicle 2 has been described above, the autonomous driving vehicle 2 is, however, not limited to such an example as long as the autonomous driving vehicle 2 is capable of implementing the automatic valet parking.

Further, the user terminal 3 is a portable information terminal of the user and associated with the autonomous driving vehicle 2. The user terminal 3 is registered in the autonomous driving vehicle 2 as, for example, a terminal of the owner of the autonomous driving vehicle 2. The user terminal 3 may be a terminal of the user who is registered in the autonomous driving vehicle 2 as a temporary owner by rental, or an authorized user by transferring instruction authority from the owner. The user terminal 3 is configured by, for example, a computer including a processor such as a CPU, a memory such as a ROM or a RAM, and a user interface including a display and a touchscreen.

The user terminal 3 has a function of issuing a parking request and a pick-up request to the parking lot management server 1. By operating the user terminal 3, the user can issue the parking request and the pick-up request as the automatic valet parking. The user grants the instruction authority of the autonomous driving vehicle 2 to the parking lot management server 1 by, for example, stopping the autonomous driving vehicle 2 at the drop-off space 62 of the drop-off area 52 within the parking lot 50, alighting from the autonomous driving vehicle 2, operating the user terminal 3, and issuing the parking request.

The user issues the pick-up request to cause the autonomous driving vehicle 2 parked in the parking space 61 via the parking lot management server 1 to travel to the pick-up space 63 of the pick-up area 53 via the parking lot management server 1. The autonomous driving vehicle 2 waits for the user in the pick-up space 63. In a case where, for example, the autonomous driving vehicle 2 arrives at the pick-up space 63 and stops, the parking lot management server 1 waives the instruction authority for the autonomous driving vehicle 2. The instruction authority may be waived when the user issues an instruction to open a door of the autonomous driving vehicle 2 or start the autonomous driving vehicle 2. The instruction authority may be waived by the autonomous driving vehicle 2. The operation of the autonomous driving vehicle 2 caused by the parking request and the pick-up request is not limited to the description stated above. The same shall apply to the parking lot management server 1.

Hereinafter, modified examples of the instruction change target vehicle specifying unit 13 and the vehicle instruction unit 14 will be described with reference to the drawings.

Figure 5:
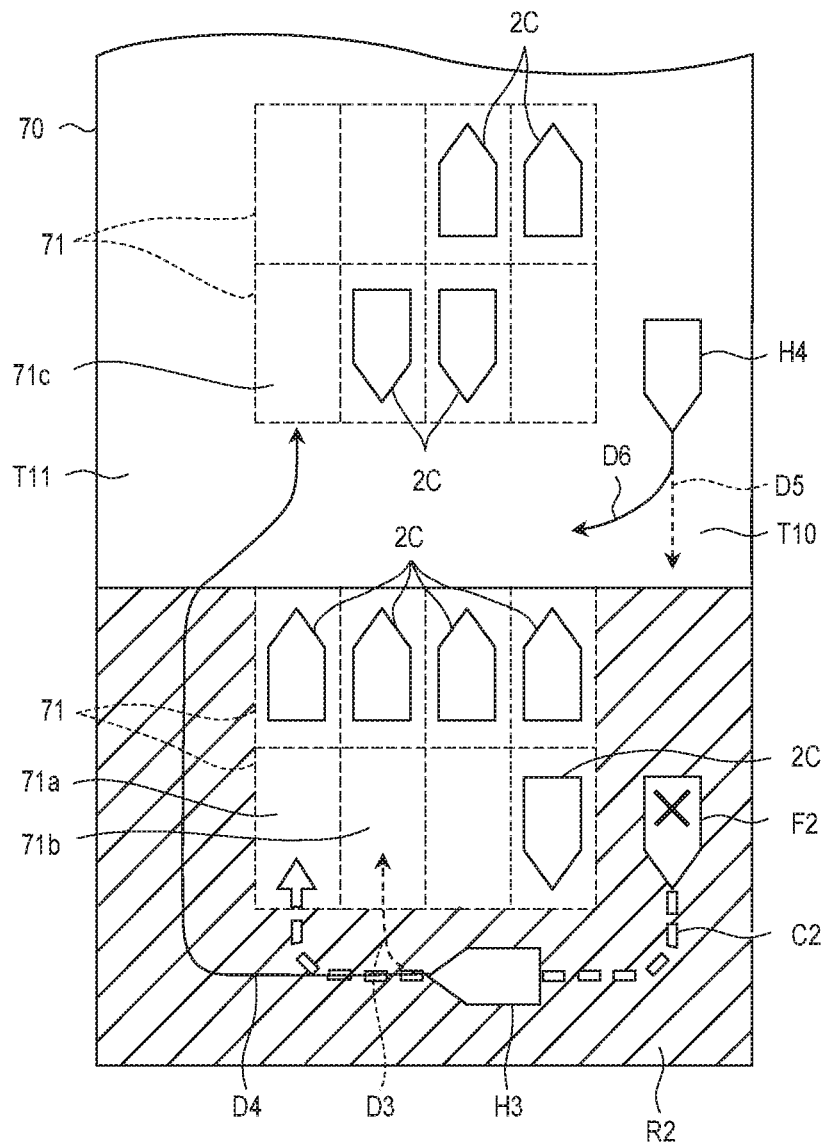
FIG. 5 is a plan view illustrating another example of specifying the instruction change target vehicle and changing an instruction.

FIG. 5 is a plan view illustrating another example of specifying the instruction change target vehicle and changing the instruction. FIG. 5 shows a parking lot 70, a parking space 71, intersections T10 and T11, a failed vehicle F2, a target area R2, and instruction change target vehicles H3 and H4.

FIG. 5 also shows a failed-vehicle route C2 that is a target route of the failed vehicle F2, a target parking space 71a of the failed vehicle F2, a target route D3 before changing a route of the instruction change target vehicle H3, a target route D4 after changing a route of the instruction change target vehicle H3, a target parking space 71b before changing a route of the instruction change target vehicle H3, a target parking space 71c after changing a route of the instruction change target vehicle H3, a target route D5 before changing a route of the instruction change target vehicle H4, and a target route D6 after changing a route of the instruction change target vehicle H4. The target parking space 71b is a parking space adjacent to the target parking space 71a of the failed vehicle F2 in a vehicle width direction of the parked vehicle.

In the situation shown in FIG. 5, the instruction change target vehicle specifying unit 13 sets an area from an intersection T11 one section ahead the failed vehicle F2 to an intersection T10 one section behind the failed vehicle F2 as a target area R2. In the situation shown in FIG. 5, the instruction change target vehicle specifying unit 13 may set an area from the location of the failed vehicle F2 to the intersection T10 one section behind the failed vehicle F2 as the target area R2, as shown in FIG. 4.

The instruction change target vehicle specifying unit 13 may change the target area according to the type of failure. The types of failures are broadly divided into the abnormality and the communication interruption. The abnormality is classified into abnormality related to the automatic driving traveling and abnormality related to the automatic driving parking.

In a case where a failed vehicle exists due to the communication interruption, the instruction change target vehicle specifying unit 13 sets the target area R2 from the intersection T11 one section ahead the failed vehicle F2 to the intersection T10 one section behind the failed vehicle F2, since the failed vehicle F2 is likely to continuously run. In this case, a parking space adjacent to the target parking space 71a of the failed vehicle F2 and the target parking space 71a in the vehicle width direction of the parked vehicle may be included in the target area R2.

On the other hand, in a case where a failed vehicle exists due to the abnormality, the instruction change target vehicle specifying unit 13 sets the target area R2 from the failed vehicle F2 to the intersection T10 one section behind the failed vehicle F2, since the failed vehicle F2 is likely to be stopped by itself or stopped by the instruction from the vehicle instruction unit 14, similarly to a case of FIG. 4.

The instruction change target vehicle specifying unit 13 specifies the normal autonomous driving vehicle H3 located in the target area R2 as the instruction change target vehicle H3. The instruction change target vehicle specifying unit 13 specifies the normal autonomous driving vehicle H4 expected to enter the target area R2 as the instruction change target vehicle H4.

In the situation shown in FIG. 5, the vehicle instruction unit 14 issues the route change instruction or the evacuation instruction to the instruction change target vehicle H3 located in the target area R2. The instruction change target vehicle H3 is located in front of the failed vehicle F2, and the target parking space 71b is next to the target parking space 71a of the failed vehicle F2. In this case, the vehicle instruction unit 14 can issue the route change instruction with the change of the target parking space to the instruction change target vehicle H3.

Specifically, the vehicle instruction unit 14 issues the route change instruction to the instruction change target vehicle H3 such that the instruction change target vehicle H3 changes the target route D3 directed to the target parking space 71b to the target route D4 directed to the new target parking space 71c. The new target parking space 71c is a parking space not adjacent to the target parking space 71a of the failed vehicle F2. The new target parking space 71c can be a parking space that is not in contact with the target area R2.

The vehicle instruction unit 14 may issue the evacuation instruction to the instruction change target vehicle H3 when the traveling path on which the instruction change target vehicle H3 travels has a width that allows a plurality of vehicles to run side by side. The vehicle instruction unit 14 may issue, for example, the evacuation instruction to the instruction change target vehicle H3 such that the vehicle stops by a side of the traveling path. The vehicle instruction unit 14 may issue the evacuation instruction to cause the instruction change target vehicle H3 to travel to and stop at a location beyond the intersection T11 ahead.

In a case where the instruction change target vehicle H3 is located behind the failed vehicle F2 and in the target area R2, the vehicle instruction unit 14 can issue the route change instruction or stop instruction including a reversing of the instruction change target vehicle H3.

Further, in the situation shown in FIG. 5, the vehicle instruction unit 14 issues the route change instruction, the evacuation instruction or the stop instruction to the instruction change target vehicle H4 expected to enter the target area R2. The vehicle instruction unit 14 issues the route change instruction to the instruction change target vehicle H4, for example, such that the instruction change target vehicle H4 changes the target route D5 entering the target area R2 to the target route D6 that does not enter the target area R2. The target route D6 is a route that does not enter the target area R2 by making a right turn at the intersection T10 immediately behind the location of the failed vehicle F2. The vehicle instruction unit 14 may determine the target parking space as needed.

The vehicle instruction unit 14 may issue the evacuation instruction that causes the vehicle to get away from a straight line extending behind the failed vehicle F2. The vehicle instruction unit 14 may issue, for example, the evacuation instruction to cause the instruction change target vehicle H4 to travel to and stop at a location after the vehicle makes a right turn at the intersection T10. The vehicle instruction unit 14 may issue the evacuation instruction to evacuate the instruction change target vehicle H4 to the nearest vacant parking space. The vehicle instruction unit 14 may issue the stop instruction to stop the instruction change target vehicle H4 at the current location.

The vehicle instruction unit 14 issues the evacuation instruction or the stop instruction to the instruction change target vehicle H4 when the instruction change target vehicle H4 is leaving the parking lot and needs to enter the target area to head to the pick-up area.

The vehicle instruction unit 14 issues the route change instruction or the evacuation instruction to the instruction change target vehicle H4 in a case where the failed vehicle F2 has failed due to the communication interruption, and issues the route change instruction or the stop instruction to the instruction change target vehicle H4 in a case where the failed vehicle F2 has failed due to the abnormality.

Figure 6:
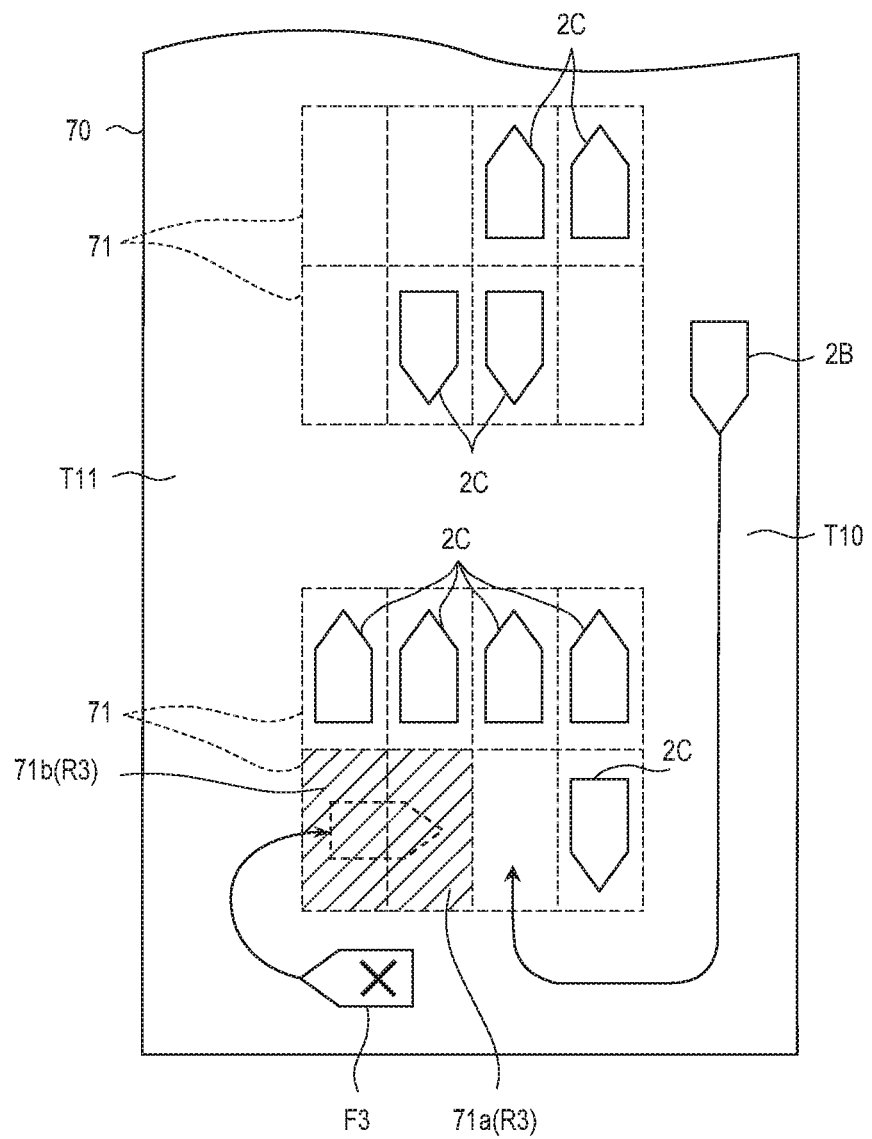
FIG. 6 is a plan view illustrating still another example of specifying the instruction change target vehicle and changing the instruction.

Further, FIG. 6 is a plan view illustrating still another example of specifying the instruction change target vehicle and changing the instruction. FIG. 6 shows a failed vehicle F3, a target area R3, and parking spaces 71a and 71b. The parking space 71a and the parking space 71b are adjacent parking spaces in the vehicle width direction of the parked vehicle.

In FIG. 6, the failed vehicle F3 recognizes the abnormality by itself and requests the parking lot management server 1 for evacuation guidance. The abnormality of the failed vehicle F3 is merely abnormality related to the automatic driving parking such as the sonar sensor failure, and the automatic driving is available. The vehicle instruction unit 14 of the parking lot management server 1 issues the instruction with the parking space 71a and the parking space 71b, which are the nearest to the failed vehicle F3, as the evacuation spaces.

In the situation illustrated in FIG. 6, the instruction change target vehicle specifying unit 13 may set the parking space 71a and the parking space 71b, which are the evacuation spaces of the failed vehicle F3, as the target area R3. In this case, the instruction change target vehicle specifying unit 13 specifies, in a case where there is a normal autonomous driving vehicle running with the parking space 71a and the parking space 71b as the target parking spaces, such a normal autonomous driving vehicle as the instruction change target vehicle.

In this case, in FIG. 6, the autonomous driving vehicle 2B located behind the failed vehicle F3 is expected to be parked in the parking space 71 in front of the target area R3 and thus is not specified as the instruction change target vehicle because it does not enter the target area R3. The instruction change target vehicle specifying unit 13 may set the target area including the traveling path of failed vehicle as shown in FIG. 4 or 5 even when the abnormality that occurs is one with which the vehicle can still evacuate, such as in the case of failed vehicle F3.

Figure 7A:
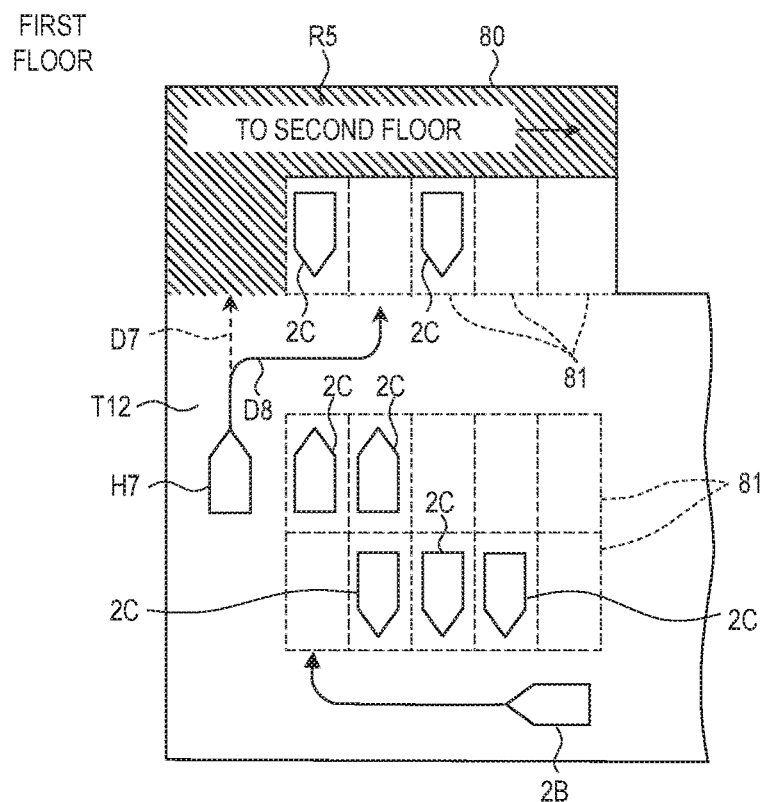
FIG. 7A is a plan view showing a first floor of a multi-story parking lot.
Figure 7B:
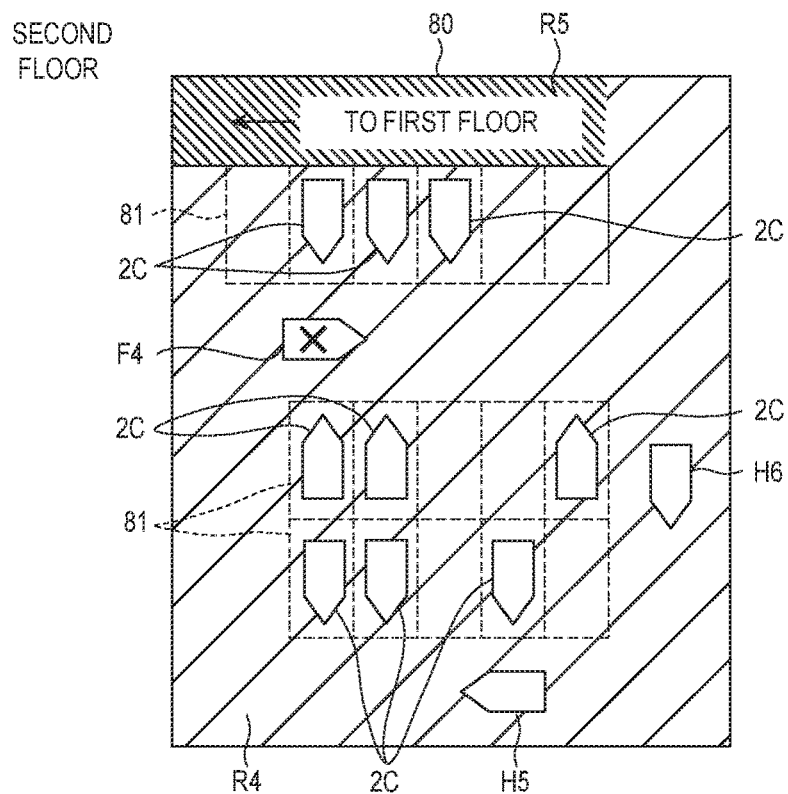
FIG. 7B is a plan view showing a second floor of the multi-story parking lot.

Still another example of specifying the instruction change target vehicle and changing the instruction will be described with reference to FIGS. 7A and 7B. FIG. 7A is a plan view showing a first floor of the multi-story parking lot. FIG. 7B is a plan view showing a second floor of the multi-story parking lot.

FIGS. 7A and 7B show a multi-story parking lot 80, a parking space 81, an intersection T12, a failed vehicle F4, target areas R4 and R5, and instruction change target vehicles (normal autonomous driving vehicles) H5 to H7, a target route D7 before changing a route of the instruction change target vehicle H7, and a target route D8 after changing a route of the instruction change target vehicle H7.

The intersection T12 is an intersection located in front of a slope from the first floor to the second floor of the multi-story parking lot 80. The target area R4 is an area set for the second floor where the failed vehicle F4 is located. The target area R4 covers areas other than the slope leading to the first floor. The target area R5 is an area from the slope end on the second floor where the failed vehicle F4 is located to the intersection T12 on the first floor. The instruction change target vehicle H5 and the instruction change target vehicle H6 are autonomous driving vehicles 2 traveling on the second floor. The instruction change target vehicle H7 is the autonomous driving vehicle 2 traveling on the first floor along the target route to the second floor.

As shown in FIGS. 7A and 7B, the instruction change target vehicle specifying unit 13 sets the target area R4 at the level where the failed vehicle F4 is located in the multi-story parking lot 80 having a plurality of levels. The instruction change target vehicle specifying unit 13 may further set the target area R5 from the slope end on the second floor to the intersection T12 on the first floor. The target area R5 may or may not be included in the target area R4.

The instruction change target vehicle specifying unit 13 specifies the normal autonomous driving vehicles H5 and H6, which are located in the target area R4, as the instruction change target vehicles H5 and H6. The instruction change target vehicle specifying unit 13 specifies the normal autonomous driving vehicle H7 expected to enter the target areas R4 and R5 as the instruction change target vehicle H7.

The vehicle instruction unit 14 issues the stop instruction or the evacuation instruction to the instruction change target vehicles H5 and H6, which are located in the target area R4. The vehicle instruction unit 14 issues the route change instruction or the stop instruction to the instruction change target vehicle H7 expected to enter the target areas R4 and R5. The vehicle instruction unit 14 issues the route change instruction so as to change, for example, the target route of the instruction change target vehicle H7 from the target route D7 toward the target areas R4 and R5 to the target route D8 by which the vehicle is parked on the first floor without traveling the target areas R4 and R5.

In addition, the instruction change target vehicle specifying unit 13 does not have to set the target area. The instruction change target vehicle specifying unit 13 may specify the instruction change target vehicle without using the target area.

The instruction change target vehicle specifying unit 13 may specify the normal autonomous driving vehicle located on the failed-vehicle route which is the target route from the location of the failed vehicle to the target parking space of the failed vehicle as the instruction change target vehicle. When the vehicle leaves the parking lot, the target route from the location of the failed vehicle to the pick-up space 63 of the failed vehicle is the failed-vehicle route.

The instruction change target vehicle specifying unit 13 may specify, for example, in the situation shown in FIG. 5, the normal autonomous driving vehicle H3 located on the failed-vehicle route C2 of the failed vehicle F2 as the instruction change target vehicle H3.

Further, the instruction change target vehicle specifying unit 13 may specify the normal autonomous driving vehicle expected to enter the failed-vehicle route as the instruction change target vehicle. The instruction change target vehicle specifying unit 13 may specify, for example, in the situation shown in FIG. 5, the normal autonomous driving vehicle H4 expected to enter the failed-vehicle route C2 (the normal autonomous driving vehicle H4 having the target route D5 overlapped with the failed-vehicle route C2) as the instruction change target vehicle H4. Further, the normal autonomous driving vehicle expected to enter the failed-vehicle route includes the normal autonomous driving vehicle having the target route intersecting the failed-vehicle route.

Processing of Autonomous Driving Vehicle and Automatic Parking System

Figure 8A:
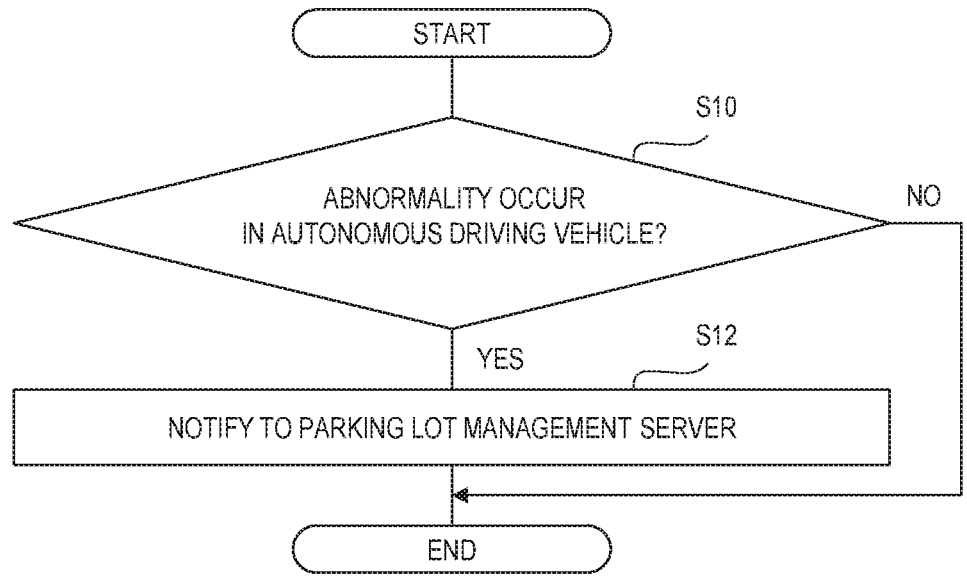
FIG. 8A is a flowchart illustrating one example of an abnormality notification process in the autonomous driving vehicle 2.

Hereinafter, processing of the autonomous driving vehicle 2 and the automatic parking system 100 will be described with reference to the drawings. FIG. 8A is a flowchart illustrating one example of an abnormality notification process in the autonomous driving vehicle 2. The abnormality notification process is executed in the autonomous driving vehicle 2 during the automatic valet parking.

As shown in FIG. 8A, the automatic driving ECU 20 of the autonomous driving vehicle 2 determines in S10 whether or not the abnormality has occurred in the autonomous driving vehicle 2. A method for detecting the abnormality is not particularly limited, and other known methods can be adopted. When it is determined that the abnormality has occurred in the autonomous driving vehicle 2 (S10: YES), the automatic driving ECU 20 proceeds to S12. When it is determined that the abnormality has not occurred in the autonomous driving vehicle 2 (S10: NO), the automatic driving ECU 20 ends the processing.

In S12, the automatic driving ECU 20 notifies, by the vehicle information providing unit 34, the parking lot management server 1 regarding the abnormality. The vehicle information providing unit 34 notifies the parking lot management server 1 that the abnormality has occurred by providing the vehicle information including the fail information related to the abnormality.

Figure 8B:
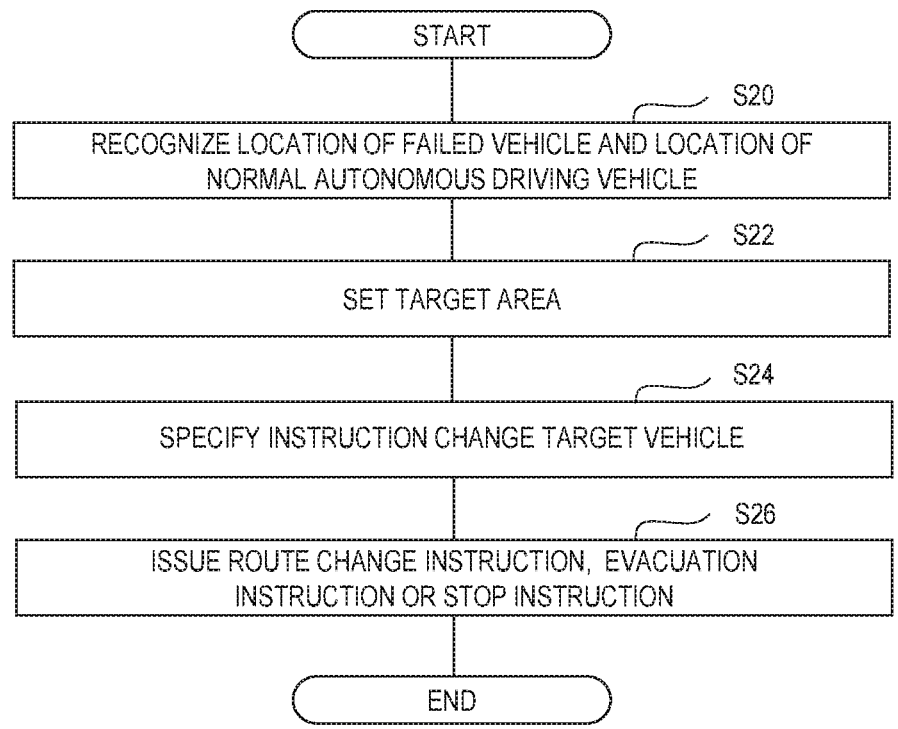
FIG. 8B is a flowchart illustrating one example of an instruction change process in the parking lot management server.

FIG. 8B is a flowchart illustrating one example of an instruction change process in the parking lot management server 1. The instruction change process is started when it is determined that the abnormality has occurred based on the vehicle information transmitted from the autonomous driving vehicle 2.

As shown in FIG. 8B, the parking lot management server 1 recognizes, by the vehicle situation recognition unit 12, the location of the failed vehicle and the location of the normal autonomous driving vehicle, as S20. The vehicle situation recognition unit 12 recognizes the location of the failed vehicle based on the vehicle information transmitted from the failed vehicle which has failed due to the abnormality. The vehicle situation recognition unit 12 recognizes the situation of the normal autonomous driving vehicle based on the vehicle information transmitted from the normal autonomous driving vehicle.

In S22, the parking lot management server 1 sets the target area by the instruction change target vehicle specifying unit 13. The instruction change target vehicle specifying unit 13 sets, for example, an area from the failed vehicle (due to the abnormality) to the intersection one section behind the failed vehicle as the target area.

In S24, the parking lot management server 1 specifies the instruction change target vehicle by the instruction change target vehicle specifying unit 13. The instruction change target vehicle specifying unit 13 specifies a normal autonomous driving vehicle located in the target area, among the normal autonomous driving vehicles, as the instruction change target vehicle. The instruction change target vehicle specifying unit 13 may specify a normal autonomous driving vehicle expected to enter the target area, among the normal autonomous driving vehicles, as the instruction change target vehicle.

In S26, the parking lot management server 1 transmits the route change instruction, the evacuation instruction or the stop instruction to the instruction change target vehicle by the vehicle instruction unit 14. The vehicle instruction unit 14 issues the route change instruction or the stop instruction to the instruction change target vehicle expected to enter, for example, the target area of the failed vehicle. The vehicle instruction unit 14 changes the target route of the instruction change target vehicle to the target route that does not enter the target area in the route change instruction. The vehicle instruction unit 14 issues the stop instruction or the evacuation instruction to the instruction change target vehicle in which the course ahead is obstructed by the failed vehicle. Thereafter, the parking lot management server 1 terminates the processing.

Figure 9A:
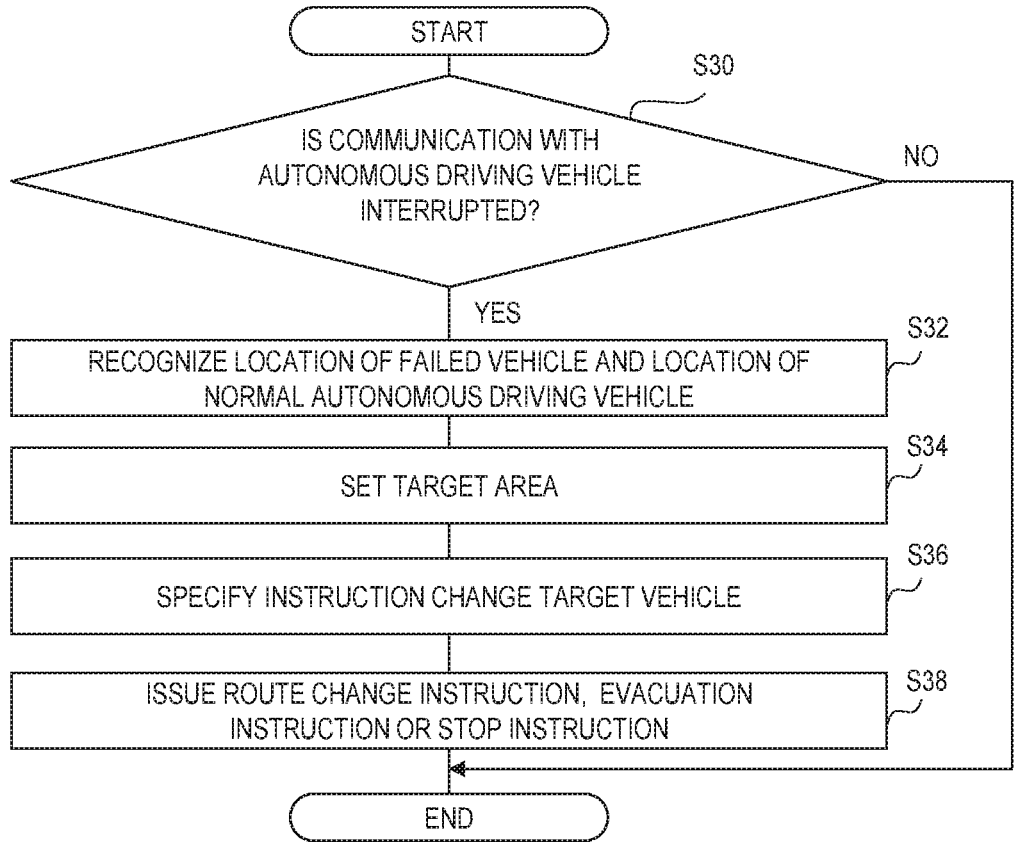
FIG. 9A is a flowchart illustrating one example of an instruction change process in the parking lot management server due to a communication interruption.

FIG. 9A is a flowchart illustrating one example of the instruction change process in the parking lot management server 1 due to the communication interruption. The parking lot management server 1 executes the instruction change process due to the communication interruption during the automatic valet parking.

As shown in FIG. 9A, the parking lot management server 1 determines, by the vehicle situation recognition unit 12, in S30 whether or not the communication with the autonomous driving vehicle 2 has been interrupted. For example, in a case where a situation in which the communication with the autonomous driving vehicle 2 is unavailable for at least a certain period of time, the vehicle situation recognition unit 12 determines that the communication has been interrupted. When it is determined that the communication with the autonomous driving vehicle 2 has been interrupted (S30: YES), the parking lot management server 1 proceeds to S32. When it is not determined that the communication with the autonomous driving vehicle 2 has been interrupted (S30: NO), the parking lot management server 1 terminates the processing.

In S32, the parking lot management server 1 recognizes, by the vehicle situation recognition unit 12, the location of the failed vehicle and the location of the normal autonomous driving vehicle. This processing is the same as that in S22, and descriptions thereof will be omitted.

In S34, the parking lot management server 1 sets the target area by the instruction change target vehicle specifying unit 13. The instruction change target vehicle specifying unit 13 sets, for example, the area from the intersection one section ahead the failed vehicle (failed vehicle which has failed due to the communication interruption) to the intersection one section ahead the failed vehicle as the target area. As described above, the instruction change target vehicle specifying unit 13 may set a wider target area as compared with a failed vehicle which has failed due to the abnormality, since the failed vehicle which has failed due to the communication interruption is likely to autonomously travel by itself. Further, in a case where both the abnormality and the communication interruption occur, the failed vehicle is considered to be a failed vehicle which has failed due to the communication interruption.

In S36, the parking lot management server 1 specifies the instruction change target vehicle by the instruction change target vehicle specifying unit 13. This processing is the same as that in S24, and descriptions thereof will be omitted.

In S38, the parking lot management server 1 transmits the route change instruction, the evacuation instruction or the stop instruction to the instruction change target vehicle by the vehicle instruction unit 14. The vehicle instruction unit 14 issues the route change instruction or the evacuation instruction to the normal autonomous driving vehicle located in the target area in front of the failed vehicle. The vehicle instruction unit 14 issues the route change instruction so that the normal autonomous driving vehicle gets away from the failed-vehicle route that is, for example, the target route of the failed vehicle (the target route that the vehicle has not passed). Thereafter, the parking lot management server 1 terminates the processing.

Figure 9B:
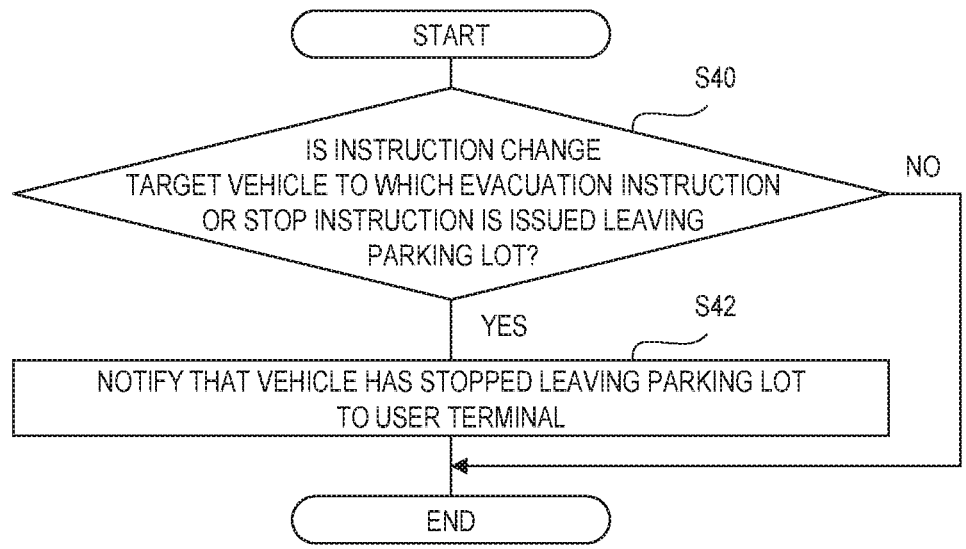
FIG. 9B is a flowchart illustrating one example of a user notification process in the parking lot management server.

FIG. 9B is a flowchart illustrating one example of a user notification process in the parking lot management server 1. The user notification process is executed, for example, in a case where the evacuation instruction or the stop instruction is transmitted to the instruction change target vehicle which is leaving the parking lot.

As illustrated in FIG. 9B, the parking lot management server 1 determines whether or not the instruction change target vehicle to which the evacuation instruction or the stop instruction has been transmitted, by the user notification unit 15, is leaving the parking lot in S40. In a case where it is determined that the instruction change target vehicle to which the evacuation instruction or the stop instruction has been transmitted is leaving the parking lot (S40: YES), the parking lot management server 1 proceeds to S42. In a case where it is not determined that the instruction change target vehicle to which the evacuation instruction or the stop instruction has been transmitted is leaving the parking lot (S40: NO), the parking lot management server 1 terminates the processing.

In S42, the parking lot management server 1 uses the user notification unit 15 to notify the user terminal 3 that the vehicle has stopped leaving the parking lot. The user notification unit 15 notifies the user that the autonomous driving vehicle 2 (instruction change target vehicle) of the user cannot reach the pick-up space 63. Thereafter, the parking lot management server 1 terminates the processing.

According to the automatic parking system 100 of the present embodiment stated above, in a case where the autonomous driving vehicle 2 becomes a failed vehicle due to abnormality or communication interruption during the automatic driving according to the instruction, an instruction change target vehicle is specified from among normal autonomous driving vehicles based on parking lot map information, a location of the failed vehicle, and a location of the normal autonomous driving vehicles, and then a route change instruction, an evacuation instruction, or a stop instruction is issued to the instruction change target vehicle, such that the instruction change target vehicle gets away from the failed vehicle. According to the automatic parking system 100, the instruction change target vehicle is specified and the instruction is changed as the autonomous driving vehicle 2 becomes a failed vehicle, thus it is possible to reduce the influence of the failed vehicle on the instruction change target vehicle during the automatic valet parking as compared with a case where the instruction is not changed for other autonomous driving vehicles when the autonomous driving vehicle 2 becomes a failed vehicle.

Further, according to the automatic parking system 100, in a case where a failed vehicle exists, the normal autonomous driving vehicle located in the target area from the failed vehicle to the intersection located one section behind the failed vehicle is specified as the instruction change target vehicle, thus it is possible to reduce the influence of the failed vehicle which may cause the instruction change target vehicle to be unable to move forward due to the failed vehicle obstructing the traveling path. Furthermore, according to the automatic parking system 100, in a case where a failed vehicle exists, the normal autonomous driving vehicle expected to enter the target area from the failed vehicle to the intersection located one section behind the failed vehicle is specified as the instruction change target vehicle, thus it is possible to prevent the instruction change target vehicle from entering the target area and being unable to move forward due to the failed vehicle.

According to another example of the automatic parking system 100, in a case where a failed vehicle exists during the automatic valet parking in the multi-story parking lot, the normal autonomous driving vehicle located at the level where the failed vehicle is located is specified as the instruction change target vehicle, thus it is possible to reduce the influence of the failed vehicle on the instruction change target vehicle during the automatic valet parking at the level where the failed vehicle is located. Further, in the automatic parking system 100, in a case where a failed vehicle exists during the automatic valet parking in the multi-story parking lot, the normal autonomous driving vehicle expected to enter the level where the failed vehicle is located is specified as the instruction change target vehicle, thus it is possible to reduce the influence of the failed vehicle on the instruction change target vehicle expected to enter the level where the failed vehicle is located.

The automatic parking system 100 may, in a case where a vehicle fails a failed vehicle exists, specify the normal autonomous driving vehicle located on the target route from the location of the failed vehicle to the target parking space in which the failed vehicle is instructed to park as the instruction change target vehicle. In this case, in the automatic parking system 100, it is possible to reduce the influence of the failed vehicle on the instruction change target vehicle when the failed vehicle starts to autonomously travel toward the target parking space. Further, the automatic parking system 100 may, in a case where a failed vehicle exists, specify the normal autonomous driving vehicle expected to enter the target route from the location of the failed vehicle to the target parking space in which the failed vehicle is instructed to park as the instruction change target vehicle. In this case, in the automatic parking system 100, it is possible to reduce the influence of the failed vehicle on the instruction change target vehicle when the failed vehicle starts to autonomously travel toward the target parking space.

Further, according to the automatic parking system 100, in a case where the instruction change target vehicle to which the evacuation instruction or the stop instruction has been transmitted is leaving the parking lot, the notification that the autonomous driving vehicle has to stop leaving the parking lot is transmitted to the user terminal of the user of the instruction change target vehicle, it is possible to notify the user waiting for arrival of the instruction change target vehicle regarding the situation.

The embodiments of the present disclosure have been described above, but the present disclosure is not limited to the embodiments stated above. The present disclosure can be implemented in various forms including various modifications and improvements made on the embodiments stated above, based on the knowledge of those skilled in the art.

For example, when the traveling path is configured by a plurality of lanes, the instruction change target vehicle specifying unit 13 may set the target area across the lanes, and may set the target area to be limited to being in the lane where the failed vehicle is located.

The instruction change target vehicle specifying unit 13 specifies, for example, in the situation shown in FIG. 6, the autonomous driving vehicle 2B as the instruction change target vehicle, in a case where such a vehicle has the target route passing through the location of the failed vehicle F3. In other words, the instruction change target vehicle specifying unit 13 may specify, for example, the normal autonomous driving vehicle expected to enter the target route (evacuation route) of the failed vehicle F3 reversing according to the evacuation guidance, as the instruction change target vehicle. In this case, until it is determined that the failed vehicle completely reverses to the evacuation space based on the detection result of the parking lot sensor 4 (detection result of the vacancy sensor), the vehicle instruction unit 14 may cause the autonomous driving vehicle 2B which is the instruction change target vehicle to be on standby (stopped).

In a case where the parking lot sensor 4 is failed, the vehicle instruction unit 14 may consider the failure range of the parking lot sensor 4 in the route change instruction of the instruction change target vehicle. In a case where, for example, the route change instruction is issued to the instruction change target vehicle, the vehicle instruction unit 14 sets, when there is a section where the surveillance camera of the parking lot sensor 4 is failed, the changed target route so as to avoid the faulty section of the surveillance camera. In a case where the target parking space is changed by the route change instruction, the vehicle instruction unit 14 sets, when there is a parking space where the vacancy sensor of the parking lot sensor 4 is failed, a parking space other than the parking space with the failed vacancy sensor, as the changed parking space.

The user notification unit 15 does not have to notify that the vehicle stops leaving the parking lot and does not have to notify that the failure occurs. Further, the automatic parking system 100 does not have to have the user notification unit 15.

What is claimed is:

1. An automatic parking system that instructs a plurality of autonomous driving vehicles in a parking lot such that each of the autonomous driving vehicles parks in a target parking space within the parking lot, the automatic parking system comprising a processor configured to:
   in a case where an autonomous driving vehicle becomes a failed vehicle due to abnormality or communication interruption during automatic driving according to an instruction, specify, as an instruction change target vehicle, a normal autonomous driving vehicle located in a target area which is an area from the failed vehicle to an intersection located one section behind the failed vehicle; and
   in a case where the processor specifies the instruction change target vehicle, issue an evacuation instruction, or a stop instruction to the instruction change target vehicle, such that the instruction change target vehicle gets away from the failed vehicle, until the failed vehicle is away from the instruction change target vehicle by a certain distance.

2. The automatic parking system according to claim 1, wherein:
   the parking lot is a multi-story parking lot having a plurality of levels; and
   the processor is configured to specify, as the instruction change target vehicle, a normal autonomous driving vehicle located at the same level as the failed vehicle.

3. The automatic parking system according to claim 1, wherein the processor is configured to, in a case where the autonomous driving vehicle becomes the failed vehicle due to the communication interruption, specify, as the instruction change target vehicle, a normal autonomous driving vehicle expected to enter a target route which is an area from the location of the failed vehicle to the target parking space in which the failed vehicle is instructed to park.

4. The automatic parking system according to claim 1, wherein the processor is further configured to:
   in a case where the instruction change target vehicle to which the evacuation instruction or the stop instruction has been transmitted is leaving the parking lot, transmit a notification that the autonomous driving vehicle has stopped leaving the parking lot to a user terminal of a user of the instruction change target vehicle.

* * * * *